United States Patent
Koponen et al.

(10) Patent No.: US 9,331,937 B2
(45) Date of Patent: May 3, 2016

(54) EXCHANGE OF NETWORK STATE INFORMATION BETWEEN FORWARDING ELEMENTS

(71) Applicant: Nicira, Inc., Palo Alto, CA (US)

(72) Inventors: Teemu Koponen, San Francisco, CA (US); Amar Padmanabhan, Menlo Park, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 14/348,884

(22) PCT Filed: Apr. 18, 2013

(86) PCT No.: PCT/US2013/037236
§ 371 (c)(1),
(2) Date: Mar. 31, 2014

(87) PCT Pub. No.: WO2013/158920
PCT Pub. Date: Oct. 24, 2013

(65) Prior Publication Data
US 2014/0348161 A1    Nov. 27, 2014

Related U.S. Application Data

(60) Provisional application No. 61/684,693, filed on Aug. 17, 2012, provisional application No. 61/647,516, filed on May 16, 2012, provisional application No. 61/635,226, filed on Apr. 18, 2012, provisional application No. 61/635,056, filed on Apr. 18, 2012.

(51) Int. Cl.
*H04L 12/28*    (2006.01)
*G06F 15/173*   (2006.01)
*H04L 12/721*   (2013.01)
(Continued)

(52) U.S. Cl.
CPC ............ *H04L 45/72* (2013.01); *H04L 41/0654* (2013.01); *H04L 41/0893* (2013.01); *H04L 43/0823* (2013.01); *H04L 45/64* (2013.01); *H04L 45/02* (2013.01); *H04L 49/70* (2013.01)

(58) Field of Classification Search
CPC ... H04L 41/00; H04L 41/0226; H04L 41/042; H04L 41/0654; H04L 41/0813; H04L 41/0893; H04L 41/20; H04L 41/50; H04L 43/0823; H04L 45/02; H04L 45/14; H04L 45/16; H04L 45/38; H04L 45/42; H04L 45/44; H04L 45/46; H04L 45/52; H04L 45/54; H04L 45/58; H04L 45/60; H04L 45/64; H04L 45/55; H04L 45/72; H04L 45/74; H04L 45/586; H04L 49/70; H04L 49/351; H04L 63/0272; H04L 67/16; H04L 67/327; H04L 67/1008; H04L 67/1025; H04L 67/1029
USPC ......... 370/229–240, 254–258, 389–402, 409, 370/412–429, 449, 453, 457, 461–467, 469, 370/474–476; 709/220–226, 230–250
See application file for complete search history.

(56) References Cited

U.S. PATENT DOCUMENTS 5,504,921 A    4/1996   Dev et al.
5,550,816 A    8/1996   Hardwick et al.
(Continued)

FOREIGN PATENT DOCUMENTS

AU    2012328699    4/2014
AU    2013249151    4/2014
(Continued)

OTHER PUBLICATIONS

International Search Report and Written Opinion for PCT/US2013/037236, Jul. 12, 2013 (mailing date), Nicira, Inc.
(Continued)

*Primary Examiner* — Tri H Phan
(74) *Attorney, Agent, or Firm* — Adeli LLP

(57) ABSTRACT

Some embodiments provide a network control system that includes a network controller and a set of hosts on which a set of managed forwarding elements operate. The network controller computes forwarding state information and pushes the computed forwarding state information to a set of managed forwarding elements to define forwarding behaviors of the managed forwarding elements. The managed forwarding elements receive the forwarding state information from the network controller and directly exchange with each other updates to the forwarding state information. The updates are exchanged between the managed forwarding elements without a network controller relaying the updates.

20 Claims, 11 Drawing Sheets

(51) Int. Cl.

| | |
|---|---|
| H04L 12/715 | (2013.01) |
| H04L 12/24 | (2006.01) |
| H04L 12/26 | (2006.01) |
| H04L 12/931 | (2013.01) |
| H04L 12/751 | (2013.01) |

(56) References Cited

U.S. PATENT DOCUMENTS

| | | |
|---|---|---|
| 5,729,685 A | 3/1998 | Chatwani et al. |
| 5,751,967 A | 5/1998 | Raab et al. |
| 5,796,936 A | 8/1998 | Watabe et al. |
| 5,805,791 A | 9/1998 | Grossman et al. |
| 6,104,699 A | 8/2000 | Holender et al. |
| 6,219,699 B1 | 4/2001 | McCloghrie et al. |
| 6,512,745 B1 | 1/2003 | Abe et al. |
| 6,539,432 B1 | 3/2003 | Taguchi et al. |
| 6,680,934 B1 | 1/2004 | Cain |
| 6,768,740 B1 | 7/2004 | Perlman et al. |
| 6,785,843 B1 | 8/2004 | McRae et al. |
| 6,862,263 B1 | 3/2005 | Simmons |
| 6,941,487 B1 | 9/2005 | Balakrishnan et al. |
| 6,963,585 B1 | 11/2005 | Le Pennec et al. |
| 6,999,454 B1 | 2/2006 | Crump |
| 7,046,630 B2 | 5/2006 | Abe et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,286,490 B2 | 10/2007 | Saleh et al. |
| 7,359,971 B2 | 4/2008 | Jorgensen |
| 7,450,598 B2 | 11/2008 | Chen et al. |
| 7,453,797 B2 * | 11/2008 | Deval et al. ............... 370/218 |
| 7,483,370 B1 | 1/2009 | Dayal et al. |
| 7,606,260 B2 | 10/2009 | Oguchi et al. |
| 7,627,692 B2 | 12/2009 | Pessi |
| 7,649,851 B2 | 1/2010 | Takashige et al. |
| 7,710,874 B2 | 5/2010 | Balakrishnan et al. |
| 7,730,486 B2 | 6/2010 | Herington |
| 7,792,987 B1 | 9/2010 | Vohra et al. |
| 7,818,452 B2 | 10/2010 | Matthews et al. |
| 7,826,482 B1 | 11/2010 | Minei et al. |
| 7,885,276 B1 | 2/2011 | Lin |
| 7,937,438 B1 | 5/2011 | Miller et al. |
| 7,948,986 B1 | 5/2011 | Ghosh et al. |
| 8,027,354 B1 | 9/2011 | Portolani et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,779 B2 | 11/2011 | Beardsley et al. |
| 8,166,201 B2 | 4/2012 | Richardson et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,312,129 B1 | 11/2012 | Miller et al. |
| 8,422,359 B2 | 4/2013 | Nakajima |
| 8,456,984 B2 | 6/2013 | Ranganathan et al. |
| 8,504,718 B2 | 8/2013 | Wang et al. |
| 8,621,058 B2 | 12/2013 | Eswaran et al. |
| 8,644,188 B1 | 2/2014 | Brandwine et al. |
| 8,942,256 B1 * | 1/2015 | Barth et al. ............... 370/469 |
| 2003/0093481 A1 | 5/2003 | Mitchell et al. |
| 2004/0044773 A1 | 3/2004 | Bayus et al. |
| 2004/0047286 A1 | 3/2004 | Larsen et al. |
| 2004/0073659 A1 | 4/2004 | Rajsic et al. |
| 2004/0098505 A1 | 5/2004 | Clemmensen |
| 2004/0267897 A1 | 12/2004 | Hill et al. |
| 2005/0018669 A1 | 1/2005 | Arndt et al. |
| 2005/0038834 A1 | 2/2005 | Souder et al. |
| 2005/0083953 A1 | 4/2005 | May |
| 2005/0120160 A1 | 6/2005 | Plouffe et al. |
| 2005/0228952 A1 | 10/2005 | Mayhew et al. |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0184937 A1 | 8/2006 | Abels et al. |
| 2006/0193266 A1 | 8/2006 | Siddha et al. |
| 2007/0043860 A1 | 2/2007 | Pabari |
| 2007/0156919 A1 | 7/2007 | Potti et al. |
| 2007/0220358 A1 | 9/2007 | Goodill et al. |
| 2007/0260721 A1 | 11/2007 | Bose et al. |
| 2007/0297428 A1 | 12/2007 | Bose et al. |
| 2008/0002579 A1 | 1/2008 | Lindholm et al. |
| 2008/0034249 A1 | 2/2008 | Husain et al. |
| 2008/0040467 A1 | 2/2008 | Mendiratta et al. |
| 2008/0049621 A1 | 2/2008 | McGuire et al. |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0159301 A1 | 7/2008 | de Heer |
| 2008/0165704 A1 | 7/2008 | Marchetti et al. |
| 2009/0276661 A1 | 11/2009 | Deguchi et al. |
| 2009/0279549 A1 | 11/2009 | Ramanathan et al. |
| 2010/0002722 A1 | 1/2010 | Porat et al. |
| 2010/0058106 A1 | 3/2010 | Srinivasan et al. |
| 2010/0162036 A1 | 6/2010 | Linden et al. |
| 2010/0205479 A1 | 8/2010 | Akutsu et al. |
| 2011/0103259 A1 | 5/2011 | Aybay et al. |
| 2011/0134931 A1 | 6/2011 | Merwe et al. |
| 2011/0317559 A1 | 12/2011 | Kern et al. |
| 2012/0151550 A1 | 6/2012 | Zhang |
| 2012/0158942 A1 | 6/2012 | Kalusivalingam et al. |
| 2012/0185553 A1 | 7/2012 | Nelson |
| 2013/0044636 A1* | 2/2013 | Koponen ................ H04L 47/12 370/254 |
| 2013/0044752 A1 | 2/2013 | Koponen et al. |
| 2013/0054761 A1 | 2/2013 | Kempf et al. |
| 2013/0148656 A1* | 6/2013 | Zhang .................... H04L 47/12 370/389 |
| 2013/0211549 A1 | 8/2013 | Thakkar et al. |
| 2013/0212243 A1 | 8/2013 | Thakkar et al. |
| 2013/0212244 A1 | 8/2013 | Koponen et al. |
| 2013/0212245 A1 | 8/2013 | Koponen et al. |
| 2013/0212246 A1 | 8/2013 | Koponen et al. |
| 2013/0219037 A1 | 8/2013 | Thakkar et al. |
| 2013/0287026 A1* | 10/2013 | Davie .......................... 370/392 |
| 2013/0332602 A1 | 12/2013 | Nakil et al. |
| 2013/0332619 A1 | 12/2013 | Xie et al. |
| 2014/0247753 A1 | 9/2014 | Koponen et al. |
| 2014/0351432 A1 | 11/2014 | Koponen et al. |
| 2015/0016469 A1* | 1/2015 | Ganichev ................ H04L 49/90 370/429 |
| 2015/0052262 A1* | 2/2015 | Chanda .................... H04L 45/00 709/245 |
| 2015/0100675 A1* | 4/2015 | Davie .................... H04L 45/14 709/223 |
| 2015/0100704 A1* | 4/2015 | Davie .................... H04L 45/14 709/238 |
| 2015/0103838 A1* | 4/2015 | Zhang et al. .................. 370/401 |
| 2015/0117454 A1* | 4/2015 | Koponen et al. ............. 370/392 |
| 2015/0312117 A1* | 10/2015 | Behera .................... H04L 43/08 370/241 |

FOREIGN PATENT DOCUMENTS

| | | |
|---|---|---|
| AU | 2013249154 | 4/2014 |
| EP | 1443423 | 8/2004 |
| EP | 2748706 | 7/2014 |
| EP | 2748990 | 7/2014 |
| EP | 2748993 | 7/2014 |
| EP | 2748994 | 7/2014 |
| GB | 2485866 | 5/2012 |
| WO | WO 2013/063332 | 5/2013 |
| WO | WO 2013/158917 | 10/2013 |
| WO | WO 2013/158918 | 10/2013 |
| WO | WO 2013/158920 | 10/2013 |
| WO | WO 2013/184846 | 12/2013 |

OTHER PUBLICATIONS

International Preliminary Report on Patentability for PCT/US2013/037236, Oct. 30, 2014 (mailing date), Nicira, Inc.

(56) References Cited

OTHER PUBLICATIONS

Portions of prosecution history of AU2013249154, Mar. 16, 2015 (mailing date), Nicira, Inc.
Portions of prosecution history of EP13721460.7, Oct. 9, 2014 (mailing date), Nicira, Inc.
Author Unknown, "Private Network-Network Interface Specification Version 1.1 (PNNI 1.1)," The ATM Forum Technical Committee, Apr. 2002, 536 pages, The ATM Forum.
Author Unknown, "Virtual Machine Backup Guide," Nov. 2007, pp. 1-78, VMware, Inc., Palo Alto, California.
Belaramani, Nalini, et al., "PRACTI Replication," Proc. of NSDI, May 2006, 14 pages.
Casado, Martin, et al., "SANE: A Protection Architecture for Enterprise Networks," Proceedings of the 15$^{th}$ USENIX Security Symposium, Jul. 31, 2006, pp. 137-151.
Fernandes, Natalia C., et al., "Virtual Networks: isolation, performance, and trends," Oct. 7, 2010, pp. 339-355, Institut Telecom and Springer-Verlag, Paris.
Koponen, Teemu, et al., "Onix: A Distributed Control Platform for Large-scale Production Networks," In Proc. OSDI, Oct. 2010, pp. 1-14.
Krishnaswamy, Umesh, et al., "ONOS Open Network Operating System—An Experimental Open-Source Distributed SDN OS," Apr. 16, 2013, 4 pages.
Pankaj, Berde, et al., "ONOS Open Network Operating System An Open-Source Distributed SDN OS," Dec. 19, 2013, 34 pages.
Raganai, Chaparadza, et al., "An Architectural Reference Model for Autonomic Networking Cognitive Networking and Self-Management," Mar. 2012, 179 pages, The European Telecommunications Standards Institute, Sophia-Antipolis, France.
Schneider, Fred B., "Implementing Fault-Tolerant Services Using the State Machine Approach: A Tutorial," ACM Computing Surveys, Dec. 1990, pp. 299-319, vol. 22, No. 4, ACM.
Stribling, Jeremy, et al., "Flexible, Wide-Area Storage for Distributed Systems with WheelFS," NSDI '09: 6$^{th}$ USENIX Symposium on Networked Systems Design and Implementation, Apr. 2009, pp. 43-58, USENIX Association.
Terry, Douglas B., "Managing Update Conflicts in Bayou, a Weakly Connected Replicated Storage System," SIGOPS '95, Dec. 1995, pp. 172-183, ACM, Colorado, USA.

\* cited by examiner

EXCHANGE OF NETWORK STATE INFORMATION BETWEEN FORWARDING ELEMENTS

CLAIM OF BENEFIT TO PRIOR APPLICATIONS

This application is a national stage application of PCT Application PCT/US2013/037236, filed Apr. 18, 2013, now published as WO 2013/158920. PCT Application PCT/US2013/037236 claims benefit of U.S. Provisional Patent Application 61/635,056, filed Apr. 18, 2012; U.S. Provisional Patent Application 61/635,226, filed Apr. 18, 2012; U.S. Provisional Patent Application 61/647,516, filed May 16, 2012; and U.S. Provisional Patent Application 61/684,693, filed Aug. 17, 2012. PCT Application PCT/US2013/037236, published as WO 2013/158920, and U.S. Provisional Patent Applications 61/635,056, 61/635,226, 61/647,516, and 61/684,693 are incorporated herein by reference.

BACKGROUND

In a network virtualization system, network controllers manage the network state to implement logical networks over a physical network. The network state is not a constant, and as the state changes, updates to the state must be distributed to the managed forwarding elements throughout the network. These updates to the network state may appear for at least three reasons. First, when logical policy changes because the network policy enforced by the logical pipeline is reconfigured (e.g., the updating of access control lists by an administrator of a logical network), the network state changes. Second, workload operational changes result in a change to the network state. For instance, when a virtual machine migrates from a first node to a second node, the logical view remains unchanged. However, the network state requires updating due to the migration, as the logical port to which the VM attaches is now at a different physical location. Third, physical reconfiguration events, such as device additions, removals, upgrades and reconfiguration, may result in changes to the network state.

These three different types of changes resulting in network state updates have different implications in terms of network state inconsistency (i.e., in terms of the network state not being up-to-date for a given policy or physical configuration). For instance, when the network state is not up to date because of a new policy, the logical pipeline remains operational and merely uses the old policy. In other words, while moving to enforce the new policies quickly is essential, it is typically not a matter of highest importance because the old policy is valid as such. Furthermore, the physical reconfiguration events come without time pressure, as these events can be prepared for (e.g., by moving VMs around within the physical network).

However, when the network state shared among the forwarding elements of the physical network has not yet captured all of the operational changes (e.g., VM migrations), the pipeline may not be functional. For example, packets sent to a particular logical destination may be sent to a physical location that no longer correlates to that logical destination. This results in extra packet drops that translate to a non-functional logical network, and thus the avoidance of such out-of-date network states should be given the utmost priority.

Accordingly, the network controller faces several challenges to maintain the network state. First, the virtualization itself requires precise control over the network state by the network controllers in order to enforce the correct policies and to implement the virtualization. Once the controllers become involved, the timescale for distributing updates becomes much longer than for solutions that exist purely within the data plane (e.g., traditional distributed Layer 2 learning). Second, the responsibility for the entire network state places a scalability burden on the controllers because the volume of the network state itself may become a source of complications for the controllers.

BRIEF SUMMARY

Some embodiments provide a network control system in which network controllers compute forwarding state information to push to a set of managed forwarding elements in order to define forwarding behaviors of the set of managed forwarding elements. In the network control system, managed forwarding elements then store the forwarding state and directly exchange with each other updates to the forwarding state without the network controllers relaying the updates. By removing the controller clusters from the dissemination of certain forwarding state updates, these updates can be distributed to the managed forwarding elements throughout the network much more quickly.

In some embodiments, because the network forwarding state updates exchanged directly between the managed forwarding elements are distributed much more quickly than network forwarding state updates computed by the controllers and pushed to the managed forwarding elements, certain time critical state updates are distributed in this manner. Examples of such time critical updates include operational updates, such as virtual machine (VM) migrations, that will create inconsistencies if not disseminated. Specifically, the most time-critical state information relates to mapping a first destination-specific identifier to a second destination-specific identifier with lower granularity. For instance, when a VM moves from one location to another location, the binding between the logical port to which the VM is assigned and the physical location of that logical port changes. Without a quickly-distributed update, packets sent to the VM will be forwarded to the wrong physical location.

Some embodiments disseminate this information via a pull-based (as opposed to push-based) system. Such pull-based approaches do not require each managed forwarding element to store the entire network state, but instead allows them to retrieve the state needed to forward packets actually received. Because this retrieval introduces a certain level of delay necessary to retrieve the state, the managed forwarding elements cache the pulled state information.

In some embodiments, the mappings of identifiers that make up the network forwarding state updates are disseminated as key-value pairs that map a first identifier (the key) to a second identifier (the value). These key-value pairs are used within the matches and actions of flow entries in some embodiments. For instance, a flow entry might specify that if several values are matched, including the key of the key-value pair, to perform an action at least partly based on the value (e.g., to logically forward the packet to a logical port). Thus, these key-value pairs can be individually disseminated between the managed forwarding elements.

When an edge managed forwarding element that directly interfaces with the end machines (e.g., VMs) detects a local state change (e.g., the addition or removal of a VM), the edge forwarding element publishes an updated forwarding record to one or more registry nodes. In some embodiments, this publication may entail the registration of a new key-value pair or the unregistration of a previously-registered key-value pair. In some embodiments, the registry nodes are second-level managed forwarding elements to which several edge managed forwarding elements connect.

The registry nodes store these forwarding record updates in a cache for times specified by the publishing entity. When an edge managed forwarding element receives a packet that it cannot forward, the edge managed forwarding element sends a request to pull the needed state information to one or more registry nodes. In some embodiments, the edge forwarding element sends a key in its request, and receives the corresponding value in response. Once receiving the pulled state, the edge managed forwarding element can forward the packet. In some cases, a single packet may entail several requests to the registry nodes for state information.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a network control system in which network controllers compute forwarding state information to push to a set of managed forwarding elements in order to define forwarding behaviors of the set of managed forwarding elements. In the network control system, managed forwarding elements then store the forwarding state and exchange updates to the forwarding state with each other without the network controllers being required to relay the forwarding state updates to all of the managed forwarding elements.

Figure 1:
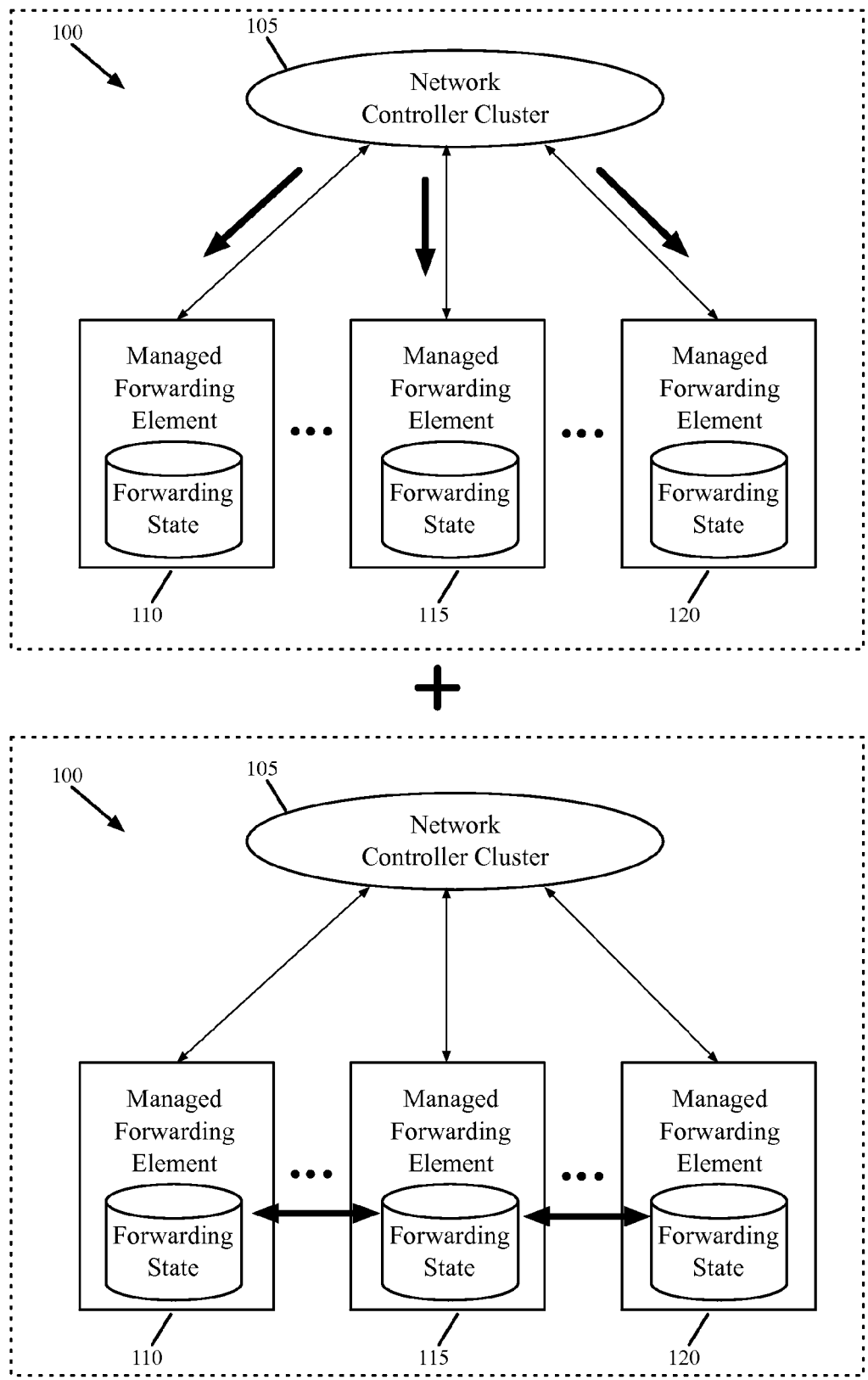
FIG. 1 illustrates a network control system in which managed forwarding elements (MFEs) exchange state updates with each other.

FIG. 1 illustrates such a network control system 100 in which managed forwarding elements (MFEs) exchange state updates with each other. The network control system 100 includes a network controller cluster 105 and three MFEs 110-120. The network control system 100 represents a simplified example, with one controller cluster pushing state down to three MFEs. In many cases, the network control system of some embodiments would include numerous controller clusters and hundreds or thousands of MFEs.

In some embodiments, the network controller cluster 105 performs computation of network state and pushes this state down to the MFEs in the form of flow entries. The network controller cluster of some embodiments receives logical control plane data that defines a logical network and converts this logical control plane data into physical control plane data to send to the MFEs 110-120. The logical control plane of a logical network, in some embodiments, defines one or more logical forwarding elements (e.g., logical switches, logical routers) that connect end machines (e.g., virtual machines) in a logical address space. The logical forwarding elements define how packets from a source machine should be forwarded in the logical space to a destination machine (e.g., the binding of virtual machine MAC addresses to logical ports). In addition, in some embodiments the logical control plane defines logical policies (e.g., access control lists) implemented by the logical forwarding elements. The logical control plane and its constructs are agnostic to the physical network through which it is implemented.

The network controller cluster of some embodiments performs several distinct conversions of the logical control plane (LCP) data to arrive at the physical control plane data that is pushed down to the MFEs. In some embodiments, the controller cluster converts LCP data into logical forwarding plane (LFP) data, then subsequently converts the LFP data into physical control plane (PCP) data. The LFP data defines forwarding entries for forwarding packets in the logical space. That is, beyond simply binding an address to a logical port, the LFP data includes an entry stating that if the address is matched, to forward the packet to the logical port.

The conversion of the LFP data to PCP data integrates the logical forwarding entries into the physical network. The PCP entries contain information to perform forwarding in the logical address space within the physical network (e.g., mapping logical ports to physical ports, etc.).

In some embodiments, the computation of PCP data to push to the MFEs is distributed between different layers of controllers. For instance, in some embodiments a single logical controller manages each logical forwarding element. The logical controller performs the LCP to LFP conversion and a subsequent LFP to universal PCP conversion. Universal PCP (UPCP) data includes flow entries that have not been customized to include data specific to any MFE, and instead only include abstractions for such data that is specific to a particular physical implementation (e.g., port numbers, tunnel identifiers, etc.).

The logical controller that manages a particular logical forwarding element sends the UPCP data to any number of physical controllers in some embodiments. Each MFE is managed by a master physical controller. Thus, UPCP data for a logical forwarding element implemented across several MFEs may be sent to the several different master physical controllers that managed these forwarding elements.

At either the physical controller, or a chassis controller in the same physical machine as the MFE, the UPCP data is converted to customized PCP (CPCP) data. The CPCP data is the physical control plane data with the customization data particular to a specific managed forwarding element filled in. As mentioned, in some embodiments the physical controller performs this conversion using information received from the MFE. In other embodiments, the physical controller acts as a pass-through to send the UPCP data to the host machine on which the MFE resides, where controller logic (the chassis controller) performs the UPCP to CPCP conversion.

The managed forwarding elements 110-120 are software or hardware forwarding elements that are managed by (e.g., receive forwarding state information from) the network controller. In some embodiments, the MFEs are software forwarding elements that operate on a host machine (e.g., within the user space and/or kernel of the host machine). These managed forwarding elements receive packets from virtual machines also operating on the host machine, perform logical processing on the packets, and send the packets across the physical network to their destination (e.g., at another virtual machine also connected to a different MFE).

Because virtual machines belonging to multiple physical networks may be located within a single host machine, each MFE may implement multiple different logical forwarding elements. Additionally, as indicated above, a single logical forwarding element will generally be implemented across numerous MFEs.

In addition to the MFEs located at the network edge, on hosts with the virtual machines, some embodiments additionally include second-level non-edge MFEs (referred to in some cases as pool nodes or service nodes). When an edge MFE is unable to perform all of the processing for a packet (e.g., because it does not have a flow entry for binding a destination MAC address to a logical port), the edge MFE sends the packet to a pool node in order for the pool node to process the packet and send the packet towards its destination.

Returning to FIG. 1, the top portion of this figure illustrates that the network controller cluster 105 pushes network forwarding state information (represented by the thick arrows) down to the MFEs 110-120. In some embodiments, this network forwarding state is pushed down in the form of physical control plane forwarding entries. In the lower portion of the figure, the managed forwarding elements 110-120 exchange forwarding state information directly with each other. This information can be exchanged at data plane speeds, which are significantly faster than control plane speeds. By removing the computation required at the network controller cluster, forwarding state information can be distributed throughout the network much more quickly.

Thus, for time critical state updates, there is a preference for offloading the state update dissemination mechanisms to the MFEs to the largest extent possible. Even for state updates that do not require rapid dissemination, moving the network state updates to the MFEs provides benefits for scaling of the logical network.

In some embodiments, policy changes to the network state (e.g., ACL rules) are propagated down from the network controller cluster 105 to the MFEs 110-120, as shown in the top portion of FIG. 1. Operational updates (e.g., VM migration information), on the other hand, are propagated directly between the MFEs, as shown in the lower portion of FIG. 1. In addition, some embodiments also propagate the operational updates upward to the controller cluster 105, so that the controllers are aware of the VM locations and can maintain complete network state information.

The differences in the operating environments between the controllers and the MFEs have implications on the state update dissemination mechanisms used. For instance, the CPU and memory resources of MFEs tend to be constrained, whereas the servers on which the controllers run are likely to have high-end server CPUs. Similarly, the controllers within a controller cluster tend to run on a number of servers, several orders of magnitude less than the number of MFEs within a network (e.g., tens or hundreds of controllers compared to tens of thousands of MFEs). Thus, while the controller clusters may favor approaches amenable to a limited number of controllers, the MFEs should ideally rely on mechanisms scalable to tens of thousands (or more) of forwarding elements.

At a high level, the distribution of network state information between forwarding elements may be performed using either a pull-based or push-based approach. The network control systems of some embodiments use a push-based approach that pushes state to the network state recipients. Such solutions proactively replicate the state to entities (e.g., the MFEs) that might need the state, whether or not those entities actually require the update. As a result, the entire network state is replicated, because any missing state information could result in the application of incorrect policy (e.g., allowing the forwarding of packets that should be dropped, or vice versa) or forwarding decisions (e.g., forwarding packets to the wrong physical destination) and the entity pushing the state to the MFEs does not know in advance which specific information the receiving entity requires.

This is not to say that each time a state update is required in a push-based system, the entire network state is disseminated. Rather, the process for pushing state information builds on existing state synchronization mechanisms of some embodiments. Irrespective of the structure of the state information, the MFEs disseminate the state updates as reliable streams of deltas (i.e., indicating changes to the state). By applying these deltas to the already-existing state information, the receiving MFEs are able to reconstruct the entire network state.

On the other hand, the network control systems of some embodiments use a pull-based approach, that does not require the replication of the entire network state. Rather than automatically pushing information for every state update to every entity that might require the updated information, the entities that actually do need the state update retrieve that information from other entities, preventing the dissemination of excessive and unnecessary network state updates.

However, because the state is not fetched until a packet requiring the state information is received by a MFE, a certain level of delay is inherent in the pull-based system. Some embodiments reduce this delay by caching the pulled state information, which itself introduces consistency issues, as a forwarding element should not use cached network state information that is out of date. To address this cache consistency requirement, some embodiments use mechanisms to revoke out of date state information within the network.

In addition, while push-based systems may disseminate state information irrespective of the structure of that information, pull-based systems of some embodiments require the state to be easily partitioned. If every update to the state for a particular logical network required a MFE to retrieve the complete network state for the logical network, the large amount of wasted resources would make such dissemination inefficient. However, in some embodiments, the network state information is easily divisible into small pieces of data. That is, a forwarding element can map each received packet to a well-defined, small portion of the state that the forwarding element can retrieve without also retrieving unnecessary information about the rest of the network. Upon receipt of a packet to forward, a MFE can quickly determine whether the needed state information is available or whether this information should be retrieved from another MFE.

As such, even with the cache consistency requirement, the pull-based system of some embodiments provides a simpler and more lightweight approach than the push-based systems. However, given the restrictions present in both the state fetching delays (which increase packet transit time) and the state structure requirements, some embodiments only disseminate certain types of network state updates through the forwarding element to forwarding element pull-based approaches.

For instance, some embodiments distribute the most time-critical network state updates between the MFEs using a pull-based approach. Workload operational changes (e.g., VM migrations) are such state updates, whereas logical policy updates do not have the same sort of time pressure. More specifically, the most time-critical network state information relates to mapping a first destination-specific identifier to a second destination-specific identifier with lower granularity. When a VM moves from one location to another location, the binding between the logical port to which the VM is assigned and the physical location of that port changes, and without a quick update, packets sent to the VM will be forwarded to the wrong physical location. Similarly, when a MAC address moves from a first logical port to a second logical port, the binding between the MAC address and the logical port should be quickly updated, lest packets sent to the MAC address be sent to the wrong logical port (and thus most likely the wrong location). The same need for timely updates applies to the binding between a logical IP address and a MAC address, in case the logical IP address moves from a first virtual interface to a second virtual interface.

Such network state can be easily divided into partitions. The binding of a logical IP address to a MAC address is defined per IP address, the binding of a MAC address to a logical port is partitioned over MAC addresses, and finally, the binding of a logical port to a physical location is partitioned over the logical ports. Because the boundaries between these different "units" of network state information can be clearly identified, the binding states are ideal candidates for pull-based dissemination.

In addition to the time-critical address and port bindings, the network control system of some embodiments uses the pull-based approach between MFEs to update some destination-specific state updates that do not have the same time sensitivity. For instance, when the physical encapsulation (e.g., the tunneling between MFEs) uses destination-specific labels for multiplexing packets destined to different logical ports onto the same tunnel between the same physical ports, the labels used are destination-specific and hence can be disseminated using a pull-based mechanism. For example, the sending MFE would know a high level port identifier of the destination port and would use that identifier to pull the mapping to a more compact label (e.g., a label assigned by the destination). In addition, the tunnel encapsulation information itself may also be distributed through the pull-based mechanisms. This tunnel encapsulation information might include tunneling details, such as security credentials to use in establishing a direct tunnel between a sender and a destination. This is an example of state information that would not need to be pushed to every MFE in a network, as it only affects the two MFEs at either end of the tunnel.

In some embodiments, this removal of the dissemination of the time-critical updates from the network controllers to the MFEs causes the decoupling of the network controllers from the time scales of the physical events. However, the controllers will nevertheless need to be involved in part with some relatively short time range physical events, such as VM migration. These operations are typically known in advance and can therefore be prepared for accordingly by the controllers (e.g., by pushing the VM-related state information before or during the VM migration so that the information is readily available once the migration finishes).

In order to implement the pull-based network state information dissemination, the network control system of some embodiments employs a dissemination service that uses a key-value pair interface. Specifically, MFEs of some embodiments can use register and unregister operations to publish and retract key-value pairs (e.g., for virtual machines to which a forwarding element connects) to a dissemination service. When forwarding a packet to an unknown destination, a MFE can use a lookup operation to pull a value that corresponds to a known key (e.g., to receive a logical port that corresponds to a destination MAC address).

The above description introduces the dissemination of network state information directly between MFEs, and specifically a pull-based system of some embodiments. Several more detailed embodiments are described below. First, Section I describes in further detail the key-value pair interface and different messages supported by the interface. Section II then describes the operation of the second level managed forwarding elements that operated as a dissemination service, while Section III describes the operation of the edge managed forwarding elements. Next, Section IV describes revocation operations of some embodiments to maintain cache consistency. Section V then describes various additional concerns for the pull-based systems of some embodiments. Finally, Section V describes an electronic system with which some embodiments of the invention are implemented.

I. Key-Value Pair Interface

As stated, the network control system of some embodiments uses a key-value pair interface for the dissemination of network state updates between MFEs. This interface is implemented on the data plane level, which allows the network control system to operate at data plane time scales, at least with regard to network state information distributed via the key-value pair interface.

Figure 2:
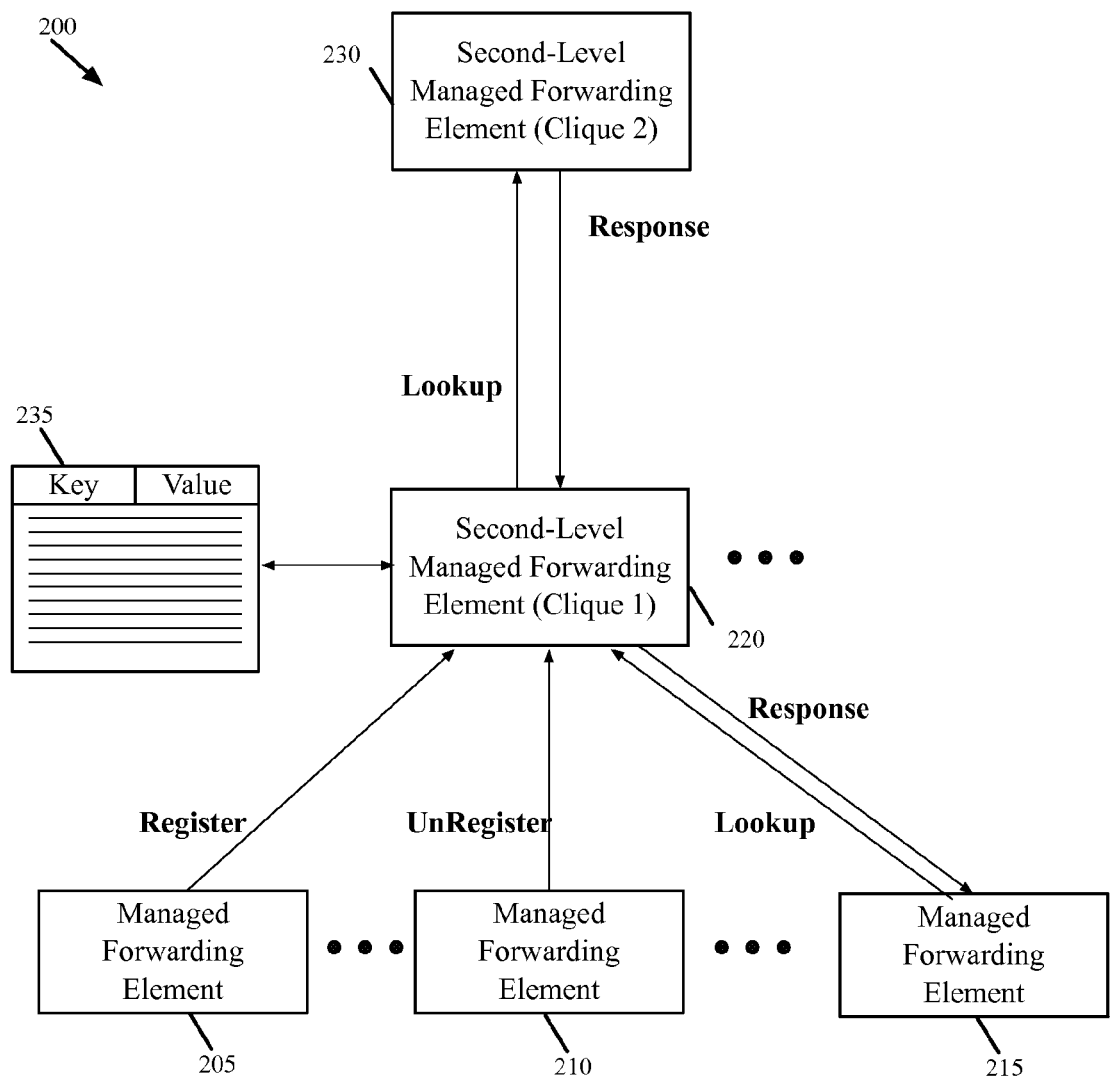
FIG. 2 conceptually illustrates examples of the use of some of the operations of the pull-based dissemination system of some embodiments.

FIG. 2 conceptually illustrates examples of the use of some of the operations of some embodiments within a managed network 200. As shown, the illustrated portion of the managed network 200 includes three edge MFEs 205-215 and two second-level MFEs 220 and 230. The second-level MFE 220 is part of a first clique along with the three edge MFEs 205-215, while the second-level MFE 230 is part of a second clique. In some embodiments, all of the MFEs within a clique are coupled to each other via a full mesh tunnel configuration, while the second-level MFEs in the clique couple to second-level MFEs in other cliques. In some embodiments, some or all of the second-level MFEs in the network are designated as registry nodes for the network state dissemination service.

Figure 3:
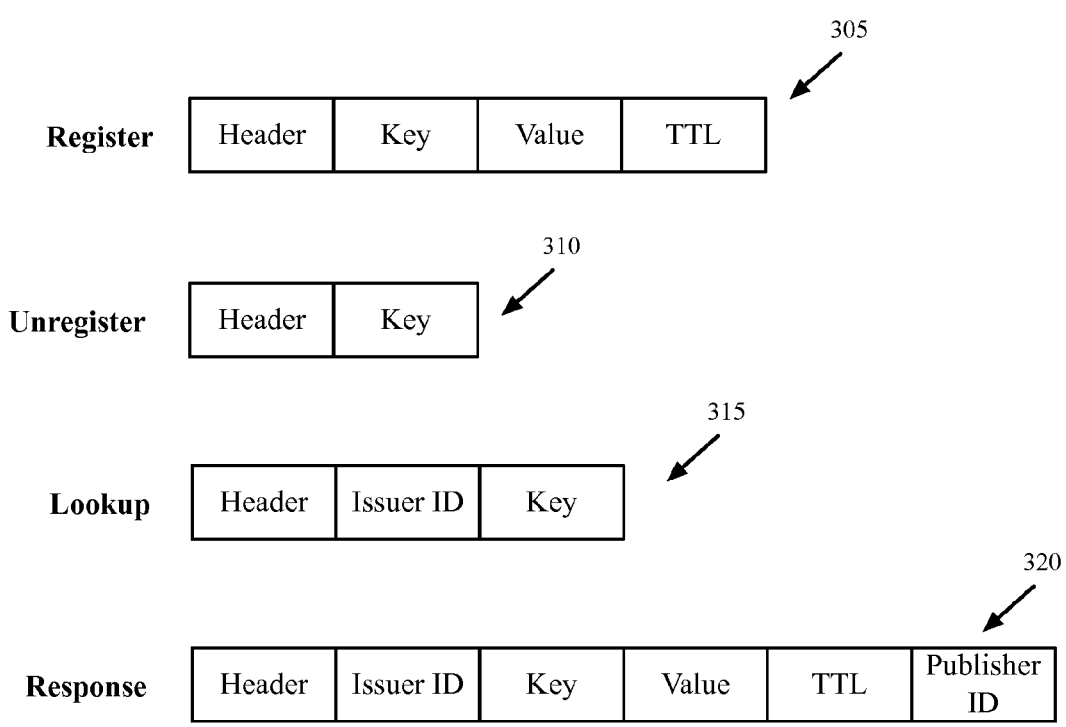
FIG. 3 conceptually illustrates the structure of packets sent between the forwarding elements for some of the operations.

Various register, unregister, lookup, and response operations enabled by the key-value pair interface are illustrated in FIG. 2. FIG. 3 conceptually illustrates the structure of packets sent between the forwarding elements for these operations. Specifically, FIG. 3 conceptually illustrates the structure of a register packet 305, an unregister packet 310, a lookup packet 315, and a response packet 320.

Returning to FIG. 2, the edge MFE 205 publishes a mapping to the second-level MFE 220 via a register operation. The register operation of some embodiments publishes a key-value pair to the registry node for a defined length of time. As shown, the register packet 305 includes, in addition to a header that identifies it as a register packet, a key, a value, and a time to live (TTL). The key and value represent a binding for one of the virtual machines connected to the edge MFE 205. Examples of such key value pairs include (logical IP, MAC), (MAC, logical port), and (logical port, physical location). For instance, when a (MAC, logical port) key value pair is published, other forwarding elements that receive packets with the published MAC address as the destination will know to logically forward the packet to the published logical port. The TTL for a particular key-value pair represents the length of time before the key-value pair expires. In some embodiments, the edge MFE re-registers its mappings well before the TTL expires (e.g., after half of the TTL has elapsed) in order to ensure that the network state remains up to date at the registry nodes.

In some embodiments, each edge MFE may connect to multiple different second-level MFEs acting as registry nodes, and publishes its mappings to each registry node to which it connects. In other embodiments, an edge MFE only publishes its mappings to a subset of the registry nodes to which it connects (e.g., by selecting nodes using a deterministic function, such as a hash that accepts the key value pair as input). In order to maximize the availability of the published mappings, in some such embodiments the registry nodes are selected to have as few disjointed failure domains as possible.

When the edge MFE 205 sends the register packet 305 to the registry node 220, the registry node identifies this packet as a register operation based on the packet header. The header information (i) separates the packet from standard network traffic to and from the VMs and (ii) identifies the packet as a register operation. In some embodiments, the registry nodes run a local daemon for handling network state updates. After identifying a packet as a register operation, the registry node automatically sends the packet internally to the local daemon for the creation of a new flow table entry based on the received information. Alternatively, instead of a register daemon, the registry nodes of some embodiments use special flow entries that cause the dynamic creation of new flow entries based on the information in a received register packet. In either case, the established flow entries match lookup messages sent with the corresponding key and generate response packets, as shown below.

As shown in FIG. 2, the registry node 220 stores a table 235 of key-value pairs it has received (e.g., from the register messages sent by its MFEs). These pairs store, for example, logical IP to MAC address bindings, MAC to logical port bindings, and logical port to physical location bindings. In addition, the table stores the TTL for each key-value pair. In some embodiments, this table is implemented as the dynamically created flow entries stored by the registry node. When the TTL for an entry is reached, some embodiments automatically remove the entry from the table (e.g., remove the flow entry for the pair from the flow table) if the pair has not been republished.

FIG. 2 additionally illustrates a second edge MFE 210 that issues an unregister operation to remove a previously published key-value pair from the table 235 by sending an unregister packet to the registry node 220. As shown, the unregister packet 310 includes only a key in addition to the header that identifies it as an unregister packet. The registry node 220 would have previously received a register packet from the MFE 210 publishing the key along with the value to which the key mapped. Upon receiving such an unregister packet, the registry node 220 removes this key-value pair from its table 235.

As with the register packets, in some embodiments the registry node identifies the packet 310 as an unregister operation based on the packet header that both separates the packet from standard network traffic and identifies it as an unregister operation. In some embodiments, the registry node automatically sends the unregister packets to its local daemon in order for the daemon to remove the corresponding flow table entry.

In FIG. 2, the third edge MFE 215 issues a lookup operation in order to receive a value that is mapped to a specific key by sending a lookup packet to the registry node 220. The edge MFE 215 receives a response packet with the mapped value from the registry node 220 in response. For instance, the MFE 215 might have a packet to send to a given destination MAC address but does not know the logical port to which the MAC address maps (and therefore is unable to perform logical forwarding on the packet). In general, when a MFE receives a packet to process (i.e., a logical network traffic packet), the switching element determines whether it can process the packet with its current network state information. When it lacks the necessary state information, the MFE (in some embodiments, via a daemon operating at the location of the MFE) sends a packet to one or more registry nodes in order to retrieve (pull) the desired network state.

As shown, the lookup packet 315 includes an issuer ID and a key, in addition to the header identifying it as a lookup packet. The issuer ID field in the packet 315 identifies the source of the lookup packet (i.e., the requesting MFE), enabling a response to be sent to the proper location. In cases (described below) in which the registry node does not have the requested key-value pair stored and instead forwards the lookup packet to another node, the issuer ID prevents any need for the registry node to store state information about pending lookup operations. The key field of the packet 315 contains the key (e.g., a destination MAC address) for which the originating MFE wishes to pull the corresponding value.

The registry node 220 may issue a response packet in response to a lookup operation. The flow entries established in the table 235 are created to match received lookup packets and generate the proper response. To generate such a response packet, the registry node looks for a match within its set of flow entries. When one of the flow entries is matched, the registry node creates a response packet by (i) changing the type of the received lookup packet to a response packet and (ii) embedding both the key and its bound value in the packet. The registry node then sends the response packet back to the requesting MFE.

However, when the registry node 220 within the requesting MFE's clique does not find a match within its table 235, the node sends the lookup message to registry nodes at any remote cliques within the network. In the example of FIG. 2, the registry node 220 does not have a match for the key in the lookup packet sent by the MFE 215, and therefore sends the lookup packet to the second-level MFE (registry node) 230, which is part of a remote clique. The network state table at the registry node 230 includes an entry for the requested key-value pair, and therefore the remote registry node 230 sends a response packet back to the local registry node 220. The local registry node 220 then forwards the response packet to the requesting MFE 215 and caches the key-value pair from the response packet (e.g., by creating a new entry in the table 235). When a remote registry node does not have a matching entry, it replies with an empty (i.e., "not found") response in order to ensure that the local registry node does not repeatedly send the request.

As mentioned, some embodiments generate a response packet by converting a received lookup packet. In some embodiments, the registry node that finds a match for the lookup modifies the header to indicate that the packet is a response rather than a lookup and appends both the value bound to the key specified in the packet and the TTL for the key-value pair. The response packet 320 in FIG. 3 includes a header, issuer ID, and key from a lookup packet, as well as the value and TTL fields. The TTL field of some embodiments specifies the remaining time before the key-value pair expires, and therefore may be significantly smaller than the original TTL for the published pair. In some embodiments, the response packet 320 also includes a publisher ID that indicates the MFE that originally published the key-value pair. As will be described below, the publisher ID is useful in revocation processing.

In some embodiments, the lookup and subsequent response have symmetric travel routes. That is, the lookup packet is sent from an MFE to a first registry node, which then forwards it (if necessary) to one or more additional registry nodes. One of these additional registry nodes then sends a response packet back to the first registry node, which forwards the packet to the requesting MFE using the issuer ID information embedded in the response packet. Because the delivery of the packets may be unreliable in both directions, the original issuer of the lookup packet (e.g., MFE 215) may re-issue the packet as necessary after a set time. Even with the travel time for the lookup and response packets, by avoiding the need for network controller computations, the state-pulling through the registry nodes remains completely at the data plane and thus remains efficient, with low latency response times.

II. Second-Level Forwarding Element Processing

As described in the previous section, a network control system using the pull-based network state dissemination of some embodiments requires operations related to the state dissemination at both the edge MFEs and the second-level (registry node) MFEs. The edge MFEs publish and retract key-value pairs in addition to forwarding data, and the forwarding of data may require the issuance of lookups. The registry nodes maintain an up-to-date network state based on the registering and unregistering of key-value pairs, and use this network state information to respond to lookup queries.

Figure 4:
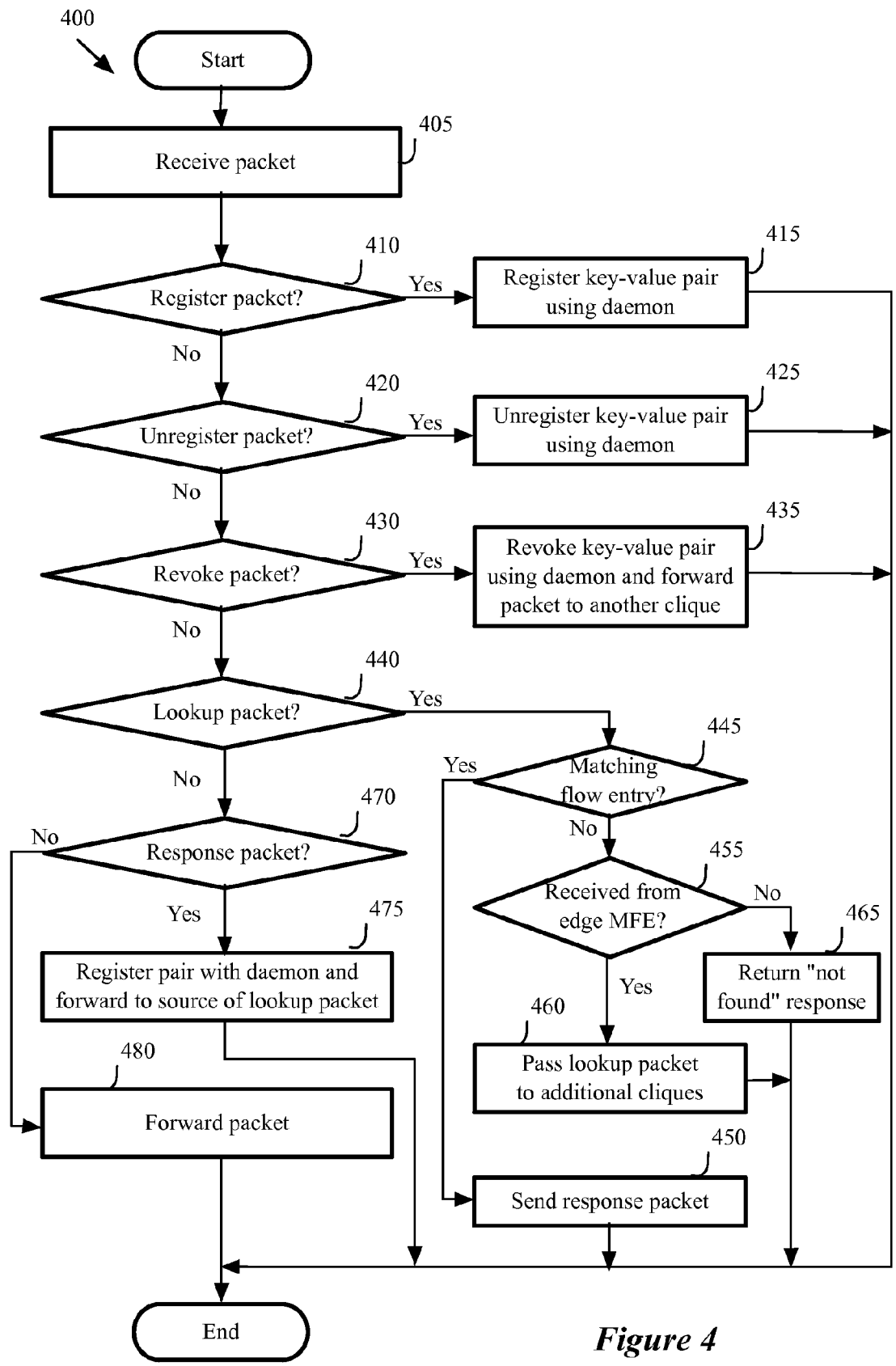
FIG. 4 conceptually illustrates a process performed by a registry node to process an incoming packet in the pull-based network state dissemination system of some embodiments.

FIG. 4 conceptually illustrates a process 400 performed by a registry node to process an incoming packet in the pull-based network state dissemination system of some embodiments. The process 400 will be described by reference to FIG. 5, which conceptually illustrates the architecture of a registry node 500 of some embodiments. The host 500 includes a second-level managed forwarding element 505 and a registering daemon 510. The second-level MFE 505 uses a forwarding table 515 for processing data packets sent as standard logical network traffic (e.g., from one VM to another).

Figure 5:
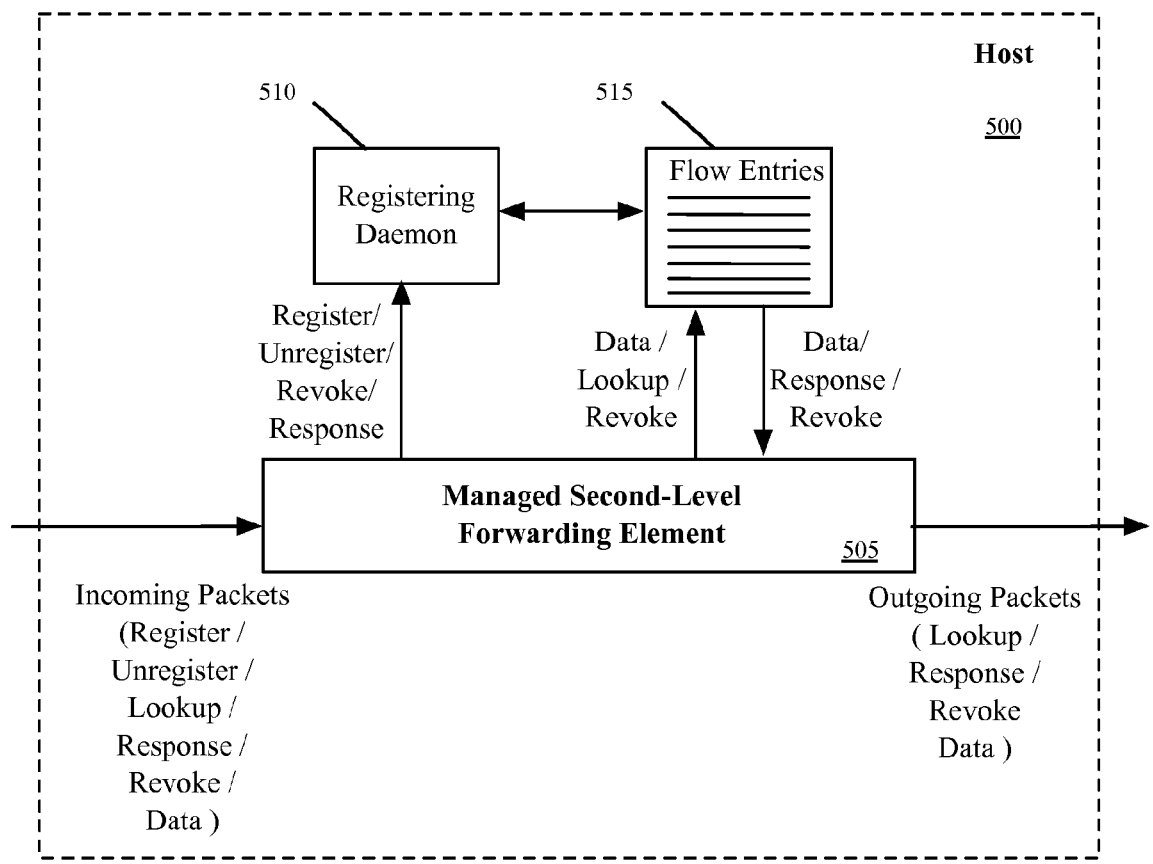
FIG. 5 conceptually illustrates the architecture of a registry node of some embodiments.

As shown, the process 400 begins when the second-level MFE receives (at 405) a packet. Packets will be received at a particular physical port (e.g., an actual physical port or a virtual port), and in some embodiments the particular port at which a packet is received affects the processing. For instance, in some embodiments a packet may be processed differently depending on whether the packet is received from an edge MFE or a different second-level MFE. The process 400 is a conceptual process that illustrates numerous different possibilities for incoming packets at a second-level MFE in a pull-based state dissemination system. While this process illustrates the operations being performed in a particular order, in some embodiments the MFE performs a lookup over its forwarding table entries, and performs an action based on a highest priority match, rather than performing specific, separate operations to check a received packet for each possibility. FIG. 5 illustrates that incoming packets at the second-level MFE 505 may be register, unregister, lookup, response, revocation, or data packets in some embodiments.

After receiving the packet, the process 400 determines (at 410) whether the packet is a register packet. As stated above, the registry node of some embodiments can identify register packets based on the packet header. The register packet contains both a key and a value bound to the key. When the received packet is a register packet from an edge MFE, the process registers (at 410) the key-value pair by using the registering daemon. In some embodiments, the MFE 505 sends the register packet to the registering daemon 510, which uses the information in the pair to create a flow entry in the table 515. For example, when the register packet includes a key-value pair of (MAC address, logical port), the generated flow entry maps to the logical port packets with the MAC address as their destination.

If not a register packet, the process 400 then determines (at 420) whether the packet is an unregister packet. As with the register packets, unregister packets may be identified by the registry node as such based on the packet header. The unregister packet contains only a key, as no bound value is necessary. When the received packet is an unregister packet from an edge MFE, the process unregisters (at 425) the key and its previous corresponding value by using the registering daemon. In some embodiments, as with register packets, the MFE 505 sends the unregister packet to the registering daemon 510. The registering daemon 510 then removes from the table 515 the key-value pair containing the key specified in the unregister packet. This prevents any future data packets that match the key from being incorrectly mapped to the corresponding value.

When the packet is not a register or an unregister packet, the process 400 determines (at 430) whether the received packet is a revoke packet. Revoke, or revocation, packets are described in further detail below. These packets are sent by an edge MFE upon receipt of a packet with an incorrect binding, and contain key for which the key-value pair is to be revoked. For instance, when an edge MFE receives a packet sent to a logical port the VM for which it is no longer connected to, the edge MFE sends a revoke packet back to the sender that specifies to revoke an entry for the data packet's destination MAC address. These packets may arrive at a second-level MFE either directly from the edge MFE issuing the revocation, or forwarded by a different MFE. As with the other state dissemination packets, the revoke packet can be identified at the second-level MFE by its header.

When the received packet is such a revocation packet, the process (i) revokes (at 435) the key and its previous corresponding value by using the registering daemon and (ii) forwards the revoke packet to a registry node at a different clique. In some embodiments, the revoke packet is only forwarded if received from an edge MFE. When a revoke packet is received from a different registry node, on the other hand, the second level MFE only sends the packet to its registering daemon. As shown in FIG. 5, the second-level MFE 505 sends revoke packets to its registering daemon 510. The registering daemon 510 treats revocation packets in the same way as unregister packets, and removes from the table 515 the key-value pair containing the key specified in the packet. In addition, as shown, the revoke packets are one of the types of packets forwarded out by the second-level MFE 505. This is the case for revoke packets that should be sent to other second-level MFEs (or, in some cases, to an edge MFE).

If the packet is not a register, unregister, or revoke packet, the process 400 determines (at 440) whether the packet is a lookup packet. As with the other state dissemination packets, the registry node identifies lookup packets based on the packet header. The lookup packet contains a key for which a bound value is requested and an issuer ID that identifies the source (i.e., and edge MFE) of the original request. For instance, when an edge MFE receives a packet from a virtual machine, the edge MFE performs a series of lookups over the packet in order to forward the packet towards its destination. In some embodiments, when the edge MFE does not have a flow entry with a match for a particular aspect of the packet (e.g., the destination MAC address), the edge MFE issues a lookup operation to one or more registry nodes to identify a value bound to the key (e.g., a logical port to which the destination MAC address maps).

When the received packet is a lookup packet, the process determines (at 445) whether its flow table includes a matching flow entry for the lookup packet. As indicated, in some embodiments the registering daemon 510 generates a flow entry in the tables 515 for future lookup packets upon receiving a register packet. The second-level MFE 505 then attempts to find a match within these flow entries 515 for the lookup packet. If the key specified in the lookup packet is registered (i.e., has a matching flow entry), the process 400 sends (at 450) a response packet that includes the value bound to the specified key as well as the remaining TTL for the key-value pair and the publisher ID that indicates the MFE that originally published the pair. The response packet, in some embodiments, is sent to the same MFE from which the lookup packet is received. When this MFE is an edge MFE, then it is the requesting MFE. On the other hand, the second-level MFE processing the lookup packet might have received the lookup packet from a second-level MFE in a different clique. In this case, the response packet is sent back to that second-level MFE, though still carrying the issuer ID of the original requesting edge MFE.

When no matching flow entry for the lookup operation is found, the process can either send a "not found" response or pass the lookup packet on to additional cliques. Thus, the process determines (at 455) whether the lookup packet was received from an edge MFE. The second-level MFE of some embodiments makes this determination based on the port (i.e., either virtual or physical interface) through which the packet is received.

When the packet is received from an edge MFE, the process passes (at 460) the lookup packet to registry nodes in additional cliques. In some embodiments, registry nodes in each clique connect in a full mesh architecture to each other, so that each clique is connected to each other clique in the network. Thus, in some embodiments, when a local registry node does not have the requested state information, that registry node passes the lookup packet to all of the other cliques. When the packet is received from a different second-level MFE, the process returns (at 465) a "not found" response, indicating that the lookup packet was received (and therefore should not be re-sent) but that a match was not found. The local registry node may receive several "not found" responses, but will only pass on such a response to the issuing edge MFE if no successful response packet is received.

When the packet is none of the above-discussed packet types, the process determines (at 470) whether the received packet is a response packet from a different registry node. The second-level MFE may receive a response packet after forwarding a lookup packet to registry nodes at remote cliques. Accordingly, response packets would be received from other registry nodes. When the packet is a response, the process registers (at 475) the key-value pair contained in the response by using the registering daemon and also forwards the response packet on to the source of the corresponding lookup. The registration process upon receiving a response packet is the same as for a register packet in some embodiments. The second-level MFE 505 passes the packet to the registering daemon 510, which creates a flow entry within the table 515. In order to forward the response packet to the appropriate edge MFE, the second-level MFE uses the issuer ID contained in the response packet, which identifies the source of the corresponding lookup.

Finally, if the packet is none of the above, then the received packet is not a network state dissemination packet. Instead, the packet is network traffic (i.e., data), and the process forwards (at 480) the packet to the appropriate destination. In this case, the second-level MFE 505 uses the flow entries 515 to forward the packet. Forwarding the packet, in some cases, will require information learned through the state dissemination operations.

III. Edge Forwarding Element Processing

A network control system using the pull-based network state dissemination of some embodiments additionally requires operations related to the state dissemination at the edge MFEs. Specifically, the edge MFEs may both publish and retract key-value pairs upon detecting local state changes. Furthermore, the forwarding of data to and from the VMs locally connected to the edge MFE (i.e., within the host machine on which an edge MFE operates) may require the issuance of lookup operations to pull network state.

Figure 6:
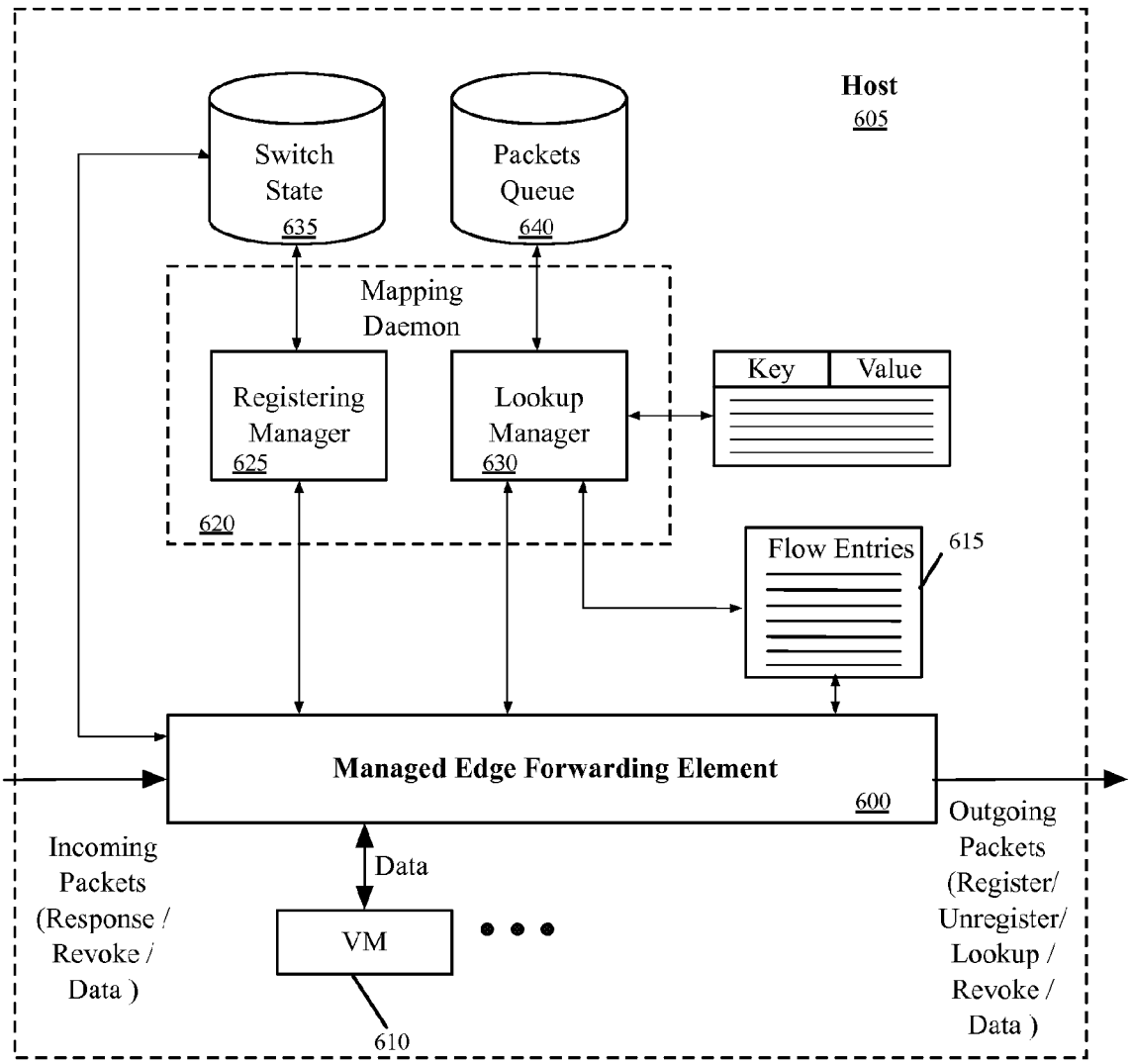
FIG. 6 conceptually illustrates the architecture of an edge managed forwarding element in a pull-based state dissemination system of some embodiments.

FIG. 6 conceptually illustrates the architecture of an edge managed forwarding element 600 in a pull-based state dissemination system of some embodiments. As shown, the edge MFE 600 is a software forwarding element that operates within a host machine 605. Other embodiments implement the edge MFEs in hardware forwarding elements (e.g., hardware switches or routers). At least one virtual machine 610 also operates on the host 605, and connects to a virtual port of the edge MFE 600. While this example shows the edge MFE operating in a host along with a virtual machine 610, in some embodiments gateways are also edge MFEs that operate in similar fashion. That is, rather than processing packets sent to and received from directly connected VMs within the machine, the gateways process packets to and from physical hosts in a separate physical network located behind the gateway. In that case, network state information relating to the physical hosts behind the gateway (e.g., MAC addresses, etc.) is registered with the second-level MFEs.

Incoming packets arrive at the MFE 600, either from the VM 610 (as well as other VMs running on the host 605) or from other MFEs. One of ordinary skill in the art will recognize that the a packet may not be received directly from another MFE, but may actually be tunneled through unmanaged forwarding elements between the sender and recipient MFEs. As shown in the figure, the incoming packets at an edge MFE may be data packets (either from another MFE or from the local VM), response packets, or revoke packets.

Lookup packets, register packets, and unregister packets are only issued by the edge MFE 600, but will not generally be received by an edge MFE.

The edge MFE 600 contains a set of flow entries 615 to use in the forwarding of incoming packets. However, in a network that uses pull-based state dissemination, the edge MFE may receive an incoming packet that it is unable to forward because it has not pulled the state required for the packet. In this case, the flow entries 615 will not include the information necessary for the edge MFE 600 to make a forwarding decision for the packet. In this case, the MFE 600 requests information from a mapping daemon 620 that also operates on the host 605 in some embodiments.

The mapping daemon 620 includes a registration manager 625 and a lookup manager 630. The registration manager of some embodiments monitors the local forwarding element state 635, which includes a configuration database as well as the flow entries 615. In addition to monitoring the database, the registration manager of some embodiments examines the traffic packets sent by the VMs (or physical machines in the case of a gateway) to identify some of the state information. This state information may include, e.g., the logical IP, MAC address, logical port, etc. for each VM operating on the host 605, including the VM 610. In addition, the state information may store tunneling information between the MFE and other MFEs to which the MFE 600 connects. When the registration manager 625 detects a change in the forwarding state 635 for information disseminated through the pull-based service, the registration manager causes the MFE 600 to issue a register or unregister packet for the relevant key-value pairs to one or more registry nodes within its clique.

When the MFE 600 receives a logical network traffic packet (e.g., from the VM 610) that cannot be processed by its flow entries 615, the MFE 600 offloads the packet to the lookup manager 630 for processing. In some embodiments, a single traffic packet may trigger multiple lookups to the mapping daemon 620 before passing through the entire logical processing pipeline in order to be ready for encapsulation and delivery to the physical next hop. For instance, a packet might require a first lookup to identify the logical port bound to the packet's destination MAC address and then a second lookup to determine the physical location bound to the identified logical port. When the lookup manager 630 receives a packet from the MFE 600, the lookup manager issues a lookup operation through the MFE 600, that is sent to one or more registry nodes.

In some embodiments, the mapping daemon 620 uses (e.g., contains) a queue 640 to store packets while waiting for the lookup responses from the registry nodes that are needed to forward the packets. In some embodiments, the mapping daemon 620 may become overloaded (e.g., if a VM sends out a large number of packets at once for which the required state is not contained within the flow entries 615. If this occurs, some embodiments allow the daemon to drop packets by either not issuing any additional lookups or issuing the lookups but dropping the corresponding packet. In addition, some embodiments do not include a queue 640, in which case the daemon drops all packets requiring a mapping lookup to the registry node.

Once a packet has been queued, the daemon issues a lookup packet (through the managed switching element 600) and sends it back to the data plane (i.e., to the MFE 600) for further processing. The daemon sends a copy of the lookup packet to several local registry nodes in some embodiments. Depending on the reliability goals of the system, the daemon may issue multiple calls in parallel to different registry nodes or wait for a first call to a first registry node to fail in order to retry by sending a new call to a different registry node.

Once a response packet is received back at the MFE 600, the forwarding element caches the response with the daemon 620. In some embodiments, the lookup manager 630 manages a cache of key-value pairs that also stores TTL information (and, in some embodiments, a publisher ID) for each pair. In addition, the mapping daemon adds a flow entry (along with a TTL) to the flow table 615 that corresponds to the key-value pair in some embodiments. In other embodiments, the MFE 600 adds a flow entry to the flow table 615 for the key-value pair based on the data contained in the response packet. At this point, packets stored in the queue 640 that require the data returned in the response packet for processing can be released to the edge MFE 600 for such processing. At this point, these packets can be forwarded to the correct destination using the flow entries 615.

In addition, future packets sent to the same destination as the now-forwarded packets can be processed completely on the data plane (i.e., without involvement of the mapping daemon 620). In some embodiments, the mapping daemon intermittently inspects flow entries to determine whether they have been actively used (i.e., whether traffic packets have been sent that matched the entry). When a flow entry is found to be in active use, the lookup manager 630 of some embodiments issues a new lookup packet for the key before the TTL expires, in order to ensure that the key-value pair is kept up to date. On the other hand, some embodiments remove an entry once the TTL expires when the entry is unused for a particular duration prior to its expiration.

Figure 7:
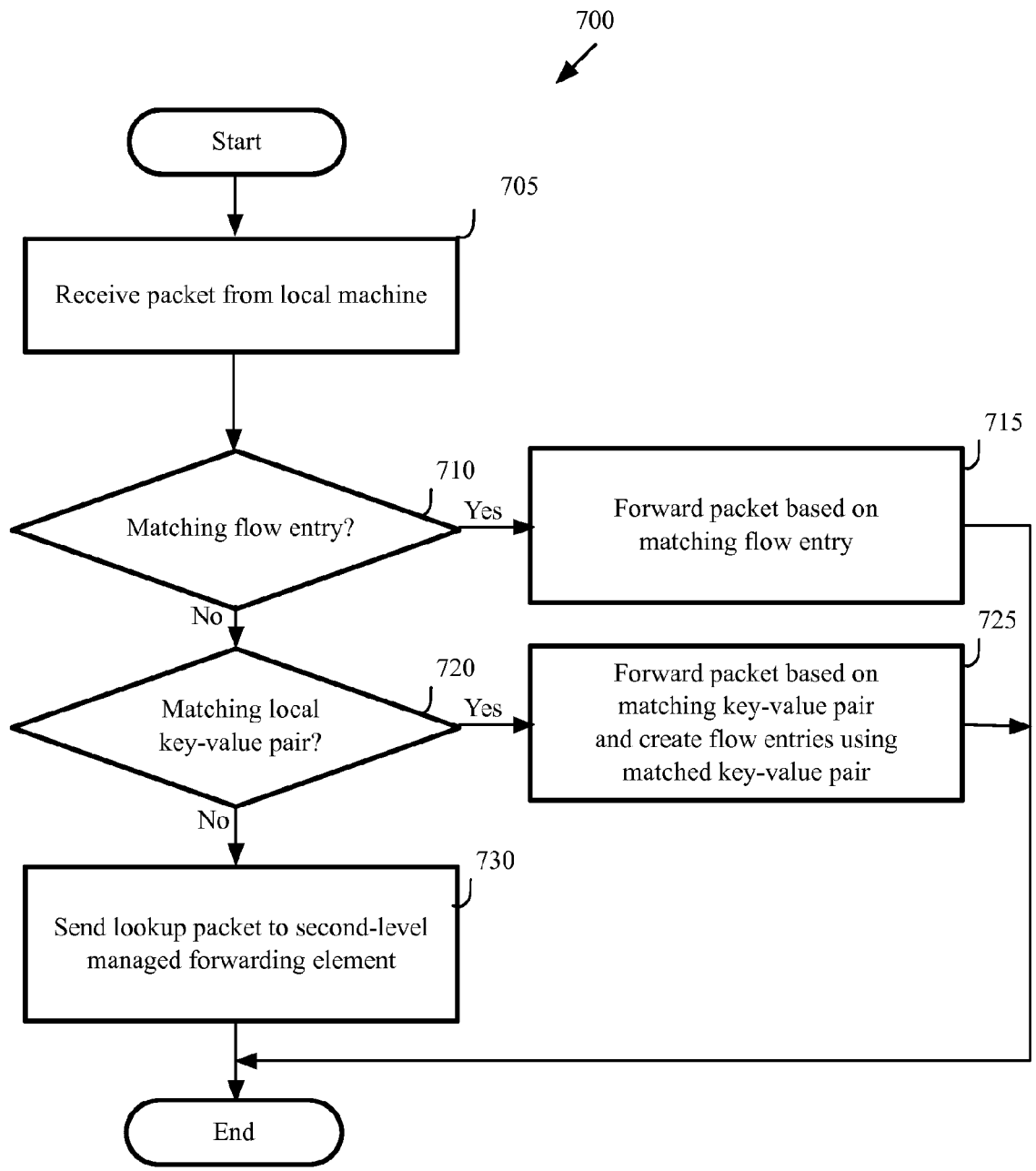
FIG. 7 conceptually illustrates a process of some embodiments performed by an edge managed forwarding element upon receipt of a packet from a local machine.

As shown in FIG. 6, the edge MFE may receive packets from other MFEs (e.g., through tunnels between the MFEs) and from the locally hosted virtual machines. FIG. 7 conceptually illustrates a process 700 of some embodiments performed by an edge MFE upon receipt of a packet from a local machine. As shown, the process begins by receiving (at 705) a packet from a local machine (e.g., a VM). Packets received from the virtual ports to which local VMs connect will generally be logical network traffic packets, rather than state dissemination packets. The network state information is only sent between the switching elements, and thus the VMs do not send or receive register, unregister, lookup, etc. packets.

Upon receiving the packet, the process 700 determines (at 710) whether a matching flow entry is available for the packet. That is, the edge MFE performs a lookup over its flow tables to determine whether a match is found. For instance, the MFE might perform a lookup for the destination MAC address specified in the packet. When the packet matches a flow entry, the process forwards (at 715) the packet based on the action specified by the matched flow entry. This forwarding of the packet may consist of performing a resubmit, as the logical processing pipeline of some embodiments requires several resubmits to match several flow entries in succession. For example, after the destination MAC address is matched, and the MFE performs an action of adding a logical egress port to the packet, some embodiments resubmit the packet in order to match the logical egress port and map the logical egress port to a physical location.

When no matching flow entry is found, the process then determines (at 720) whether a locally-cached key-value pair is available. In some embodiments, the MFE sends the packet to the lookup manager within a mapping daemon in order for the lookup manager to determine whether the packet can be processed by a key-value pair that is within its cache but does not have a flow entry created. For example, in some cases a time window exists between when the daemon receives a response to its lookup and when it updates the flow entries, and packets received within this time window may be processed using the locally-cached key-value pair. When the lookup manager finds such a cached key-value pair, the process forwards (at 725) the packet based on the matching pair and creates one or more flow entries in the MFE's flow table using the matched key value pair. The forwarding is performed in the same manner as if a matching flow entry had been found in the flow table.

On the other hand, when there is no matching flow entry in the flow table or cached key-value pair, the MFE cannot process the packet. Thus, the process sends (at 730) a lookup packet to at least one second-level MFE (registry node). In some embodiments, the process also enqueues the packet. In some embodiments, as shown in FIG. 6, the edge MFE sends the packet to a mapping daemon which holds the packet in its queue and issues the lookup request (which is then sent as a lookup packet by the edge MFE). However, as mentioned above, some embodiments drop the packet rather than keep a queue of packets awaiting lookup responses.

In addition to processing packets, the edge MFEs in the pull-based state dissemination system of some embodiments are responsible for sending out register and unregister packets. In some embodiments, the register and unregister packets are generated by a mapping daemon that runs in the user space of the host on which the edge MFE is located. The mapping daemon monitors the forwarding state information on the host and detects changes in the state that require registration or unregistration.

Figure 8:
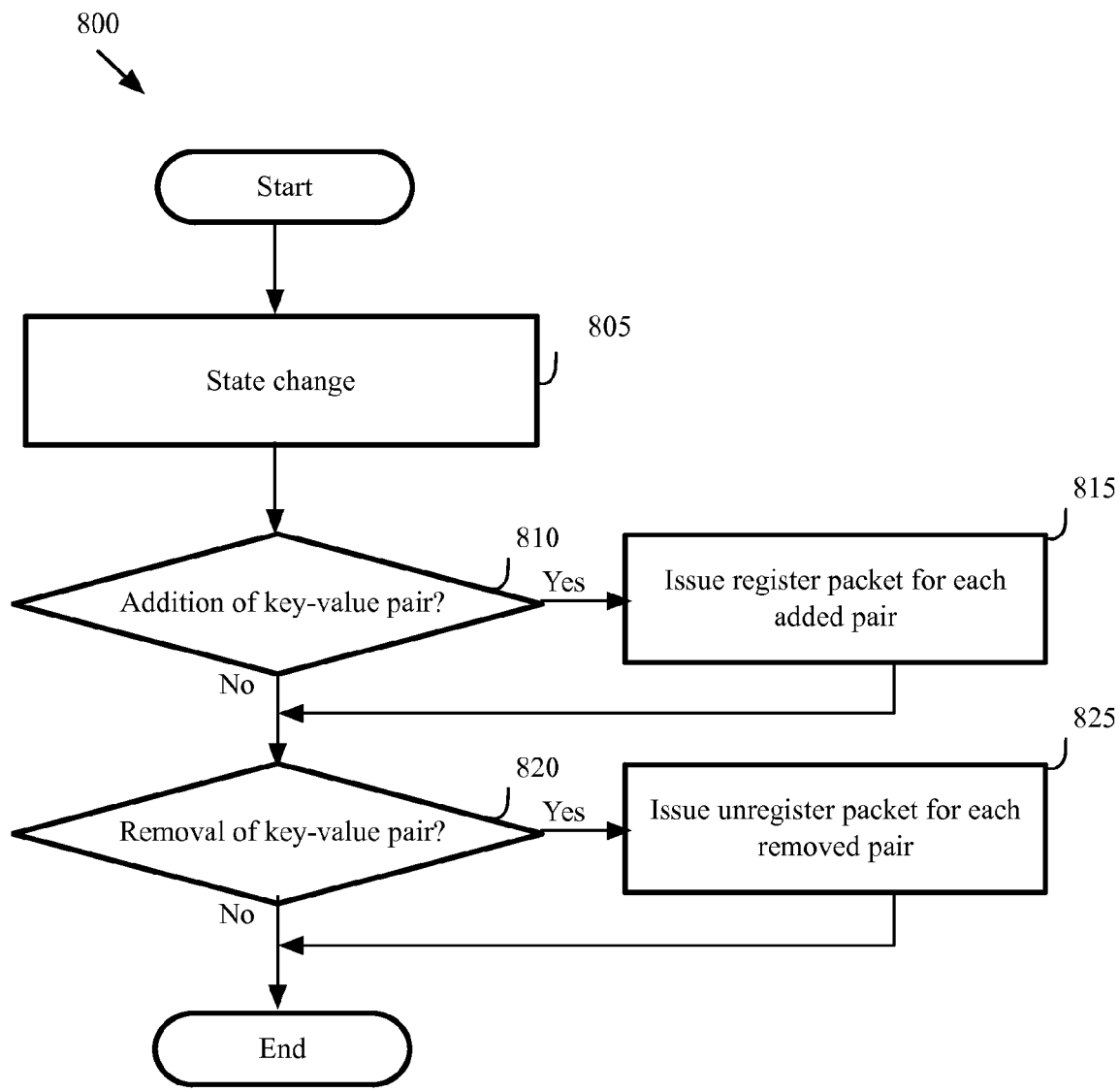
FIG. 8 conceptually illustrates a process of some embodiments performed by a mapping daemon to monitor network forwarding state and generate register and unregister packets as needed.

FIG. 8 conceptually illustrates a process 800 of some embodiments performed by a mapping daemon to monitor network forwarding state and generate register and unregister packets as needed. Specifically, the process is performed by a registering manager of a mapping daemon (e.g., registering manager 625 of FIG. 6) in some embodiments. As shown, the process 800 begins when a state change is identified (at 805). The state change may be the addition or removal of a VM to/from a host, an assignment of an existing VM to a different logical network, or any other change that affects the forwarding of packets to and from VMs operating on the host machine. In some embodiments, the state is stored in a configuration database monitored by the registering manager. When the configuration database changes, the registration manager detects the change (e.g., in either a push or pull manner) and determines whether any state dissemination operations are required. In addition, some embodiments examine the network traffic packets sent from the local VMs in order to discover state changes (e.g., the appearance of a new VM with a new MAC address).

As shown, the process 800 determines (at 810) whether addition of one or more new key-value pairs is required as a result of the state change. For instance, the migration of a VM to the host or addition of a new VM will require one or more new key-value pairs. If the VM is migrated from a different host, then its virtual MAC address and logical port may stay the same. However, the logical port will now be bound to a different physical location, requiring a new pair for this binding. In addition, some embodiments will re-register the MAC to logical port binding in case it is not known to registry nodes within the clique, and because the binding information provided from the VM's previous host may have expired. When at least one new key-value pair is required, then the process issues (at 815) a register packet for each such new key-value pair. In some embodiments, the registering manager issues this packet, which is sent out via the edge MFE to at least one registry node.

In addition, the process 800 determines (at 820) whether removal of one or more new key-pairs is required as a result of the state change. For instance, the removal of a VM from the host will require removal of one or more key-value pairs. If the VM is removed, some embodiments require the removal of all of the binding information for the VM (i.e., the MAC to logical port binding, the logical port to physical location binding, etc.). When at least one key-value pair needs to be removed, the process issues (at 825) an unregister packet for each removed key-value pair. In some embodiments, the registering manager issues the unregister packet, which is sent out via the edge MFE to at least one registry node. Some embodiments send the unregister packet to each registry node to which a register packet was previously sent for the key-value pair.

Some situations will require both additions and removals of key-value pairs. For instance, when a VM is moved from one logical data path to another logical data path (e.g., from a first logical network to a second logical network, or from one logical domain to another within a logical network), then the registering manager will issue unregister packets for the previous bindings for the VM and register packets for the new bindings.

IV. Cache Consistency and Revocation

If certain aspects of network state change while forwarding elements are still using an older cached version of the state, potential problems may result in the pull-based system. As described above, when an edge MFE issues a lookup message and then receives a response, the MFE caches the result (e.g., by creating a flow entry) for the time specified by the TTL in order to avoid issuing a new lookup message for every packet that requires the learned state information. However, if the publisher of the state information changes a binding in the learned key-value pair, the now-invalid entry remains cached until the expiration of the TTL or the issuance of a new lookup by the edge MFE. To address this potential situation, some embodiments attempt to shorten the time of inconsistency to the absolute minimum while maintaining the pull-based state dissemination model.

Figure 9:
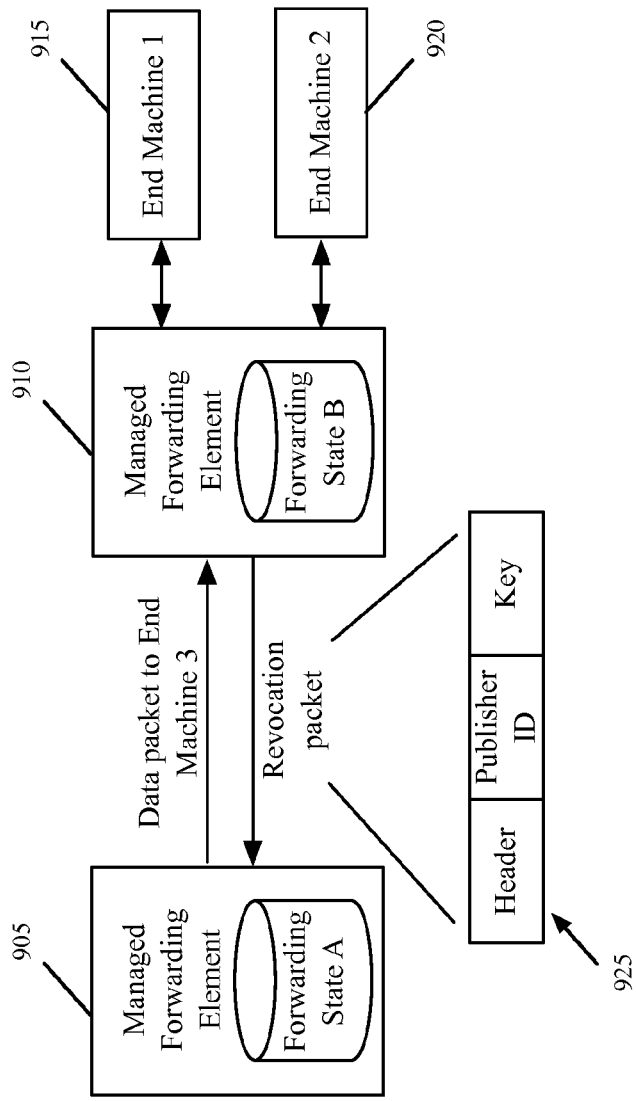
FIG. 9 illustrates an example in which a first managed forwarding element sends a data packet to a second managed forwarding element using incorrect bindings.

FIG. 9 illustrates an example in which a first MFE 905 sends a data packet to a second MFE 910 using incorrect bindings. The second MFE 910 has two end machines 915 and 920 to which it is directly connected (e.g., virtual machines hosted on the same physical host). The MFE 905 stores an outdated network forwarding state A, while the second MFE 910 stores updated network forwarding state B. In this case, due to the outdated forwarding state A at the first MFE 905, the first MFE sends a packet (through a tunnel) to the MFE 910 with a destination address for a third machine that is not connected to MFE 910.

When an MFE stores invalid state information and the MFE receives a packet that uses that state information, the forwarding element forwards the packet using that incorrect state information, as in FIG. 9. In some embodiments, the forwarding element that receives the incorrectly-forwarded packet detects the use of the incorrect state. The packet may have been sent to a destination that is no longer attached to the receiving MFE, or the bindings used in the packet are known to be wrong. To detect this, the receiving MFE of some embodiments matches over the bindings based on its local state information and therefore validates the bindings. If the receiving MFE is unable to find a match, it determines that the state information used to forward the packet is invalid.

Upon detecting that the sending MFE used an invalid state to forward the packet, the receiving MFE of some embodiments sends a revocation packet that includes the key of the key-value pair used to create the invalid binding, as well as a publisher ID that identifies the sender of the revocation packet. FIG. 9 illustrates that in response to receiving the incorrectly forwarded packet from the first MFE 905, the second MFE 910 sends a revocation packet 925 back to the first MFE 905. This contains the header identifying the packet as a revocation, a publisher ID identifying the second MFE 910, and the key for which the key-value pair should be removed from the network forwarding state at the first MFE 905.

In some embodiments, the switching element sends the revocation packet either directly to the sender or via the registry nodes. In order to send a revocation packet, the receiving MFE of the traffic packet (sender of the revocation packet) needs to determine the sending MFE of the incorrectly forwarded traffic packet. When the traffic packet is received via a direct tunnel between the two MFEs this determination can be made easily. However, when the source MFE (that used the incorrect bindings) and the destination are located at different cliques and do not directly connect via a tunnel, the packet encapsulation needs to store enough information for the receiving MFE to identify the source. Accordingly, some embodiments require the source MFE to include an identifier in its encapsulation.

In some embodiments, once the MFE that sent the traffic packet receives the revocation, it not only revokes the key-value pair from its cache and set of flow entries (assuming the current cache entry was originally published by the sender of the revocation packet), but additionally sends this revocation packet to its local registry nodes. These are the registry nodes to which it sends queries, and from which it may have received the now invalid state information. These registry nodes, in some embodiments, then forward the revocation to registry nodes at other cliques and remove the cached entries matching the key and publisher from their caches (i.e., from their flow entry tables). Using this technique, any switching element that holds invalid cached state information in its flow entries will converge towards the removal of the invalid information, with only a transient packet loss (e.g., only the first packet sent using the invalid state information).

Figure 10:
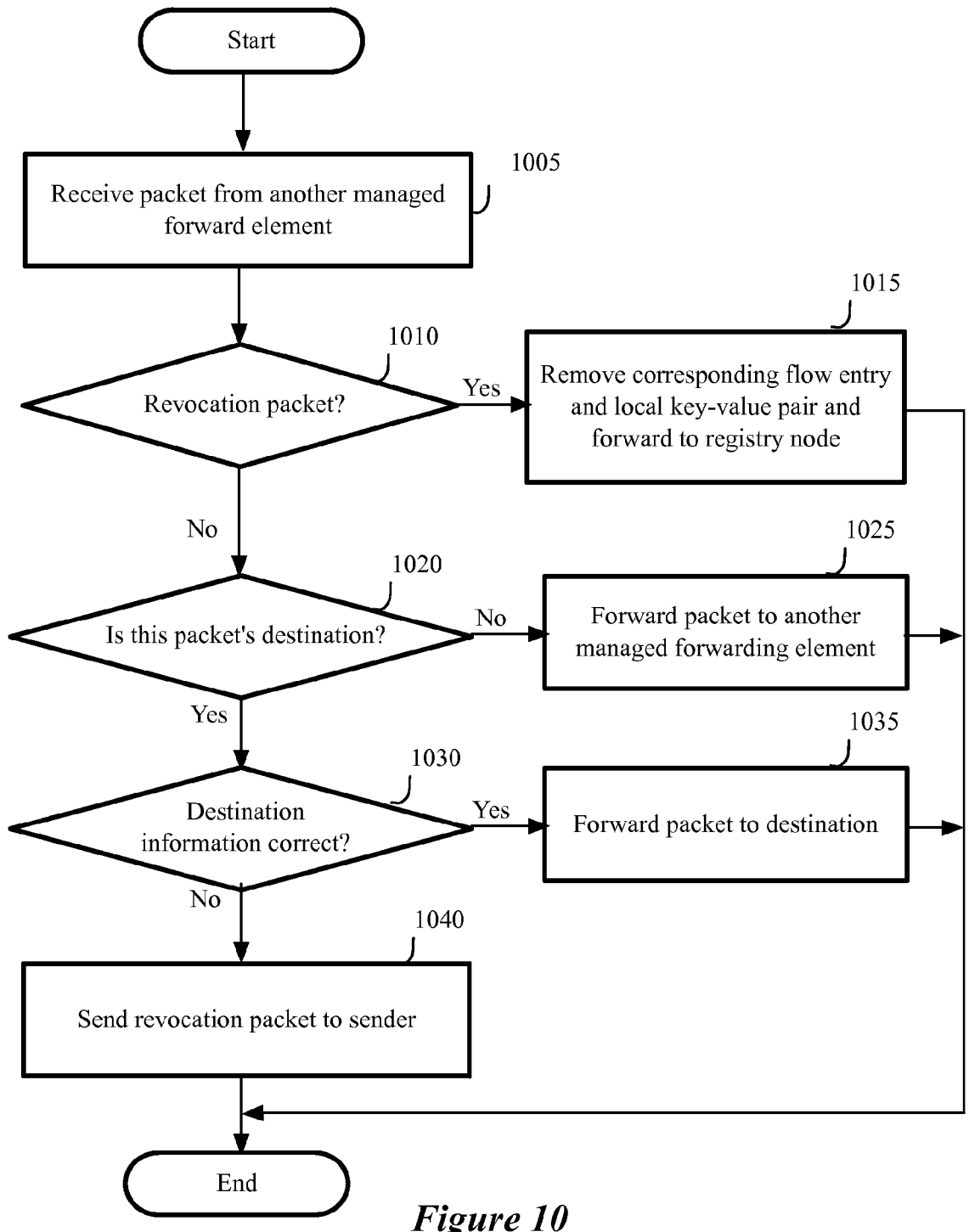
FIG. 10 conceptually illustrates a process of some embodiments performed by an edge managed forwarding element of some embodiments upon receiving a packet from another managed forwarding element.

FIG. 10 conceptually illustrates a process 1000 of some embodiments performed by an edge MFE of some embodiments upon receiving a packet from another MFE. As shown, the process begins by receiving (at 1005) a packet from another managed forwarding element. The direct source of the packet may be identified in some embodiments by the physical and/or virtual port (e.g., a tunnel) through which the packet is received.

The process 1000 determines (at 1010) whether the packet is a revocation packet. As with the other types of state dissemination packets (e.g., register, unregister, etc.), in some embodiments the MFE identifies the packet as a revocation based on header information in the packet. When the packet is a revocation packet, the process removes (at 1015) a corresponding flow entry and locally cached key-value pair based on the key and publisher ID specified in the revocation packet, and additionally forwards the revocation packet to one or more registry nodes. For instance, the revocation packet might specify that a particular logical port is no longer located at a particular physical destination (e.g., because the VM that corresponds to the logical port has migrated to a different host).

When the packet is not a revocation packet, then the process 1000 assumes the packet is a data packet. One of ordinary skill in the art will recognize that this is a conceptual process that does not account for the possibility of a packet being a response packet, and is instead concerned with the revocation aspects of a network that uses pull-based state dissemination. In the case of such a response packet, the edge MFE would add an entry based on the key and value specified in the response packet.

As the process 1000 now assumes that the received packet is a data packet (if not a revocation packet), the process determines (at 1020) whether the receiving MFE is the packet's destination. The MFE determines whether the destination address specified by the packet (i.e., the physical address) is the port on which it received the packet. When the receiving MFE (i.e., the MFE performing the process 1000) is not the packet destination, the process forwards (at 1025) the packet to another MFE based on the destination information in the packet. This may entail removing one tunnel encapsulation and adding a different tunnel encapsulation to the other MFE.

On the other hand, when the receiving MFE is the packet's destination, the process determines (at 1030) whether the destination information in the packet is correct. Specifically, the MFE checks the bindings contained in the packet, such as whether the packet is sent to a logical port and MAC address for a VM actually located at the host with the MFE. When all of these bindings are correct, the MFE forwards (at 1035) the packet to its actual destination. This destination will generally be one of the VMs operating on the host and connected to the MFE. On the other hand, when one or more of the bindings are incorrect, the MFE generates and sends (at 1040) a revocation packet to the sender of the incorrectly forwarded packet, as shown in FIG. 9.

V. Additional Concerns

1. Negative Caching

As described above, in some cases when a forwarding element issues a lookup packet in order to pull state information, the registry nodes do not yet have the requested state information. In this case, the registry node will reply to the MFE with a packet indicating that the requested information is not found. In such situations, the MFE should expect that the state information will be available at the registry node soon (either directly from the publishing MFE, or from registry nodes in other cliques). If the information required for an MFE to send a traffic packet is not being published at all, then these packets requiring a lookup operation for the non-published information should not be sent (unless someone is trying to maliciously forge packets).

These transient conditions when the MFE publishing the state information is slower than the MFE pulling the state information can generate an extra load on the MFE (similar to that caused by malicious packet forging). In order to limit this extra load, when an MFE receives a "not found" response, the MFE of some embodiments caches that result much as it would with a positive response. For example, some embodiments store a key-value pair in which the value is "not found".

The MFE (or the mapping daemon) sets a TTL for this key-value pair to a significantly lower time than would be given for a positive response. Because the "not found" result is assumed to be due to transient conditions and should be solved once a different MFE has published the needed key-value pair, the MFE should retry the lookup as soon as the system can be expected to have the value available. A long timeout would be undesirable because the cached "not found" results will not be revoked in the same manner as the expired or invalid key-value pairs described in the previous section. As they do not result in a packet being sent to an incorrect destination (or any destination at all), there will be no revocation sent back to notify the MFE to remove the result. Thus, with the short timeout, the MFE can make another attempt to lookup the key with the registry nodes.

2. Security Issues

In a push-based network control system, in which the controller cluster pushes all of the network state information to the managed forwarding elements, the security model for the network state at the forwarding elements is clear. So long as the channel to the MFEs from the controllers remains secure and the MFEs themselves are not breached, then the state information at these forwarding elements remains correct.

However, in the pull-based system described herein, in which the MFEs obtain at least some of the network state information from the registry nodes (other MFEs), the security model changes. First, the registry nodes must be trusted. In addition, the communication channels for transmitting the control-related messages (e.g., register, unregister, lookup, response, revoke, etc.) must be secured in order to prevent malicious entities from tampering with the messages at the physical network level. These communication channels include the channels between the registry nodes and the edge MFEs, as well as between the edge MFEs themselves (i.e., for revocation packets).

Some embodiments rely on a more content-oriented approach to securing these channels for exchanging control messages (as opposed to ordinary network data plane traffic). For instance, in some embodiments, the publisher of a key-value pair cryptographically signs its register messages (as well as unregister and revocation messages), under the assumption that a receiver of the messages can verify the signature and thus the validity of the data contained therein. For these cryptographic signatures and for distribution of the necessary public keys, some embodiments rely on standard public-key infrastructure (PKI) techniques.

VI. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 11:
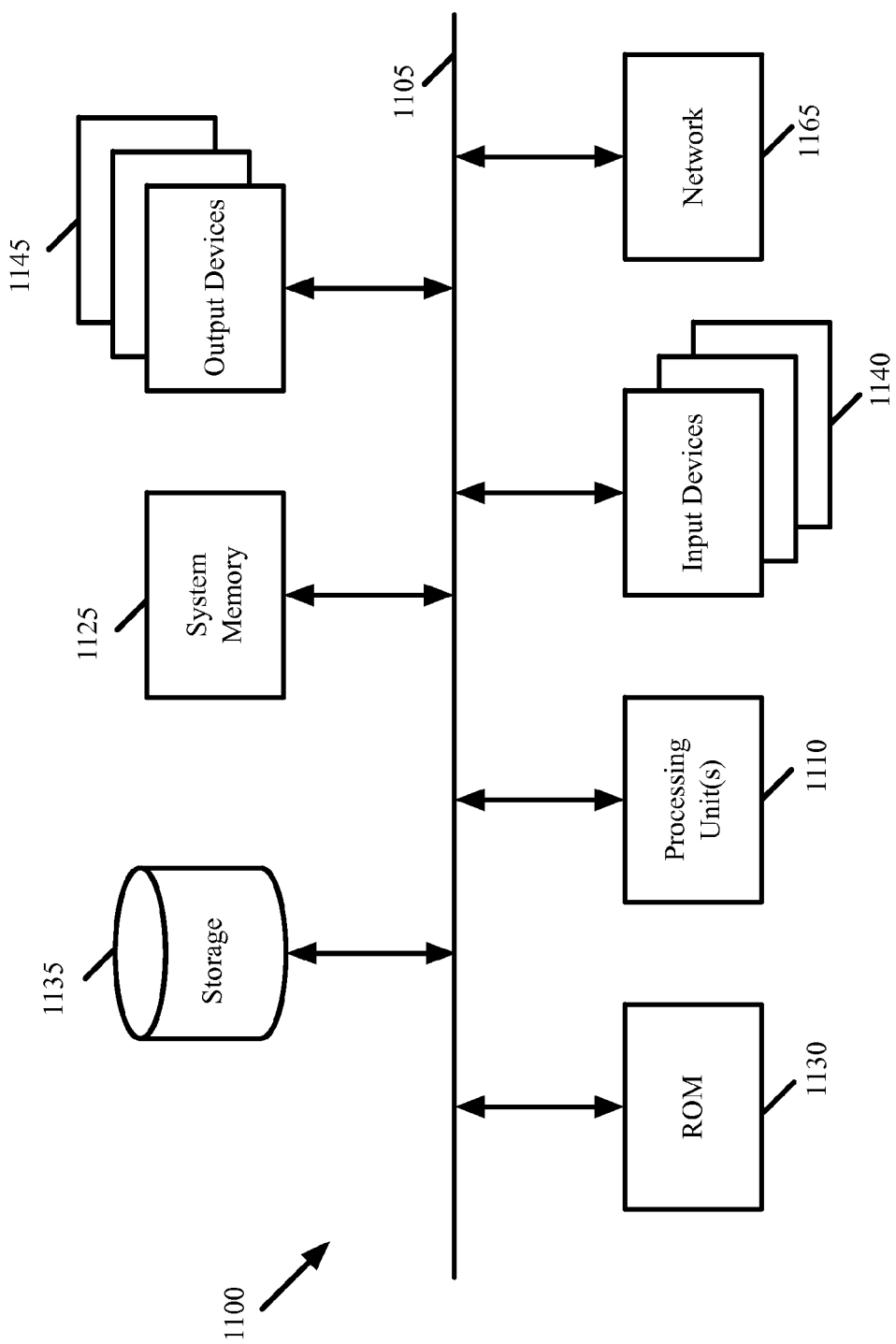
FIG. 11 conceptually illustrates an electronic system with which some embodiments of the invention are implemented.

FIG. 11 conceptually illustrates an electronic system 1100 with which some embodiments of the invention are implemented. The electronic system 1100 can be used to execute any of the control, virtualization, or operating system applications described above. The electronic system 1100 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1100 includes a bus 1105, processing unit(s) 1110, a system memory 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1130, the system memory 1125, and the permanent storage device 1135.

From these various memory units, the processing unit(s) 1110 retrieve instructions to execute and data to process in order to execute the processes of the invention. The processing unit(s) may be a single processor or a multi-core processor in different embodiments.

The read-only-memory (ROM) 1130 stores static data and instructions that are needed by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive) as the permanent storage device 1135.

Other embodiments use a removable storage device (such as a floppy disk, flash drive, etc.) as the permanent storage device. Like the permanent storage device 1135, the system memory 1125 is a read-and-write memory device. However, unlike storage device 1135, the system memory is a volatile read-and-write memory, such a random access memory. The system memory stores some of the instructions and data that the processor needs at runtime. In some embodiments, the invention's processes are stored in the system memory 1125, the permanent storage device 1135, and/or the read-only memory 1130. From these various memory units, the processing unit(s) 1110 retrieve instructions to execute and data to process in order to execute the processes of some embodiments.

The bus 1105 also connects to the input and output devices 1140 and 1145. The input devices enable the user to communicate information and select commands to the electronic system. The input devices 1140 include alphanumeric keyboards and pointing devices (also called "cursor control devices"). The output devices 1145 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 11, bus 1105 also couples electronic system 1100 to a network 1165 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 4, 7, 8, and 10) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A computer configured as a first host in a network managed by at least one network controller, the computer comprising:
 a set of processing units;
 a non-volatile storage storing:
  a first managed forwarding element for execution by at least one processing unit in the set of processing units, the first managed forwarding element for forwarding data packets to and from virtual machines operating on the first host based on forwarding state records, wherein at least a plurality of the forwarding state records are provided by a network controller; and
  a daemon for execution by at least one processing unit in the set of processing units, the daemon for (i) providing, to the first managed forwarding element, a set of forwarding state records required by the first managed forwarding element in order to forward a particular data packet and (ii) requesting forwarding state from a second managed forwarding element operating in a different second host to obtain the required set of forwarding state records from the second forwarding element to forward the particular data packet when the daemon does not have the set of forwarding state records locally available, the second managed forwarding element for forwarding data packets for a second set of virtual machines that operate on the second host.

2. The computer of claim 1, wherein the daemon comprises a lookup module for performing the providing and requesting.

3. The computer of claim 2, wherein the daemon further comprises a registering module for publishing forwarding state records of the first forwarding element to the second forwarding element in order for the second forwarding element to store the published forwarding state records in the second host.

4. The computer of claim 3, wherein the registering module is further for sending a request to the second managed forwarding element to remove a particular forwarding state record from the stored forwarding state records.

5. The computer of claim 1, wherein the first forwarding element is an edge forwarding element that directly interfaces with the virtual machines operating on the first host, wherein said virtual machines are sources and destinations of data packets.

6. The computer of claim 5, wherein the virtual machines are each for execution by at least one processing unit in the set of processing units, the virtual machines for directly interfacing with the first forwarding element within the first host.

7. A non-transitory machine readable medium storing a first managed forwarding element which when executed by at least one processing unit forwards data within a network comprising a plurality of managed forwarding elements, the first managed forwarding element comprising sets of instructions for:
 from a network controller that manages the network, receiving forwarding state records computed by the network controller;
 determining whether a set of forwarding state records required for forwarding a particular packet exists in the received forwarding state records;
 when the required set of forwarding state records do not exist in the received forwarding state records, sending a request to obtain the set of forwarding state records to a second managed forwarding element, wherein the first and second managed forwarding elements receive forwarding state records from the network controller in order to implement a set of logical forwarding elements;
 receiving the requested forwarding state records from the second managed forwarding element; and
 forwarding the packet using the forwarding state records received from the second managed forwarding element.

8. The non-transitory machine readable medium of claim 7, wherein the first managed forwarding element further comprises a set of instructions for forwarding a second packet using the forwarding state records received from the network controller.

9. The non-transitory machine readable medium of claim 7, wherein the first managed forwarding element further comprises a set of instructions for, when a local forwarding state record is updated, sending the updated forwarding state record to the second managed forwarding element in order for the second managed forwarding element to add the updated forwarding state record to a set of forwarding state records maintained by the second managed forwarding element, wherein the second managed forwarding element sends the updated forwarding state record to a third managed forwarding element when the third managed forwarding element requests the updated forwarding state record and receives forwarding state records from the network controller in order to implement the set of logical forwarding elements.

10. The non-transitory machine readable medium of claim 9, wherein the first managed forwarding element further comprises a set of instructions for sending a request to the second managed forwarding element to remove the updated forwarding state record from its maintained set of forwarding state records when the updated forwarding state record is no longer valid.

11. The non-transitory machine readable medium of claim 7, wherein the first managed forwarding element further comprises sets of instructions for:
    receiving a data packet from a third managed forwarding element;
    determining whether forwarding state records used by the third managed forwarding element to forward the packet to the first managed forwarding element are valid; and
    when the forwarding state records used by the third managed forwarding element are not valid, sending a notification to the third managed forwarding element to indicate to the third managed forwarding element that at least one of its forwarding state records is invalid, wherein the third managed forwarding element receives forwarding state records from the network controller in order to implement the set of logical forwarding elements.

12. A network control system comprising:
    a network controller for computing forwarding state information and pushing the computed forwarding state information to a set of managed forwarding elements to define forwarding behaviors of the managed forwarding elements; and
    a set of hosts on which the set of managed forwarding elements operate to forward data for sets of virtual machines operating on each host, the managed forwarding elements for receiving the forwarding state information from the network controller and directly exchanging with each other updates to the forwarding state information, wherein the updates are exchanged between the managed forwarding elements without the network controller relaying the updates.

13. The network control system of claim 12, wherein a particular update to the forwarding state information comprises a key-value pair.

14. The network control system of claim 13, wherein the key comprises a first piece of network state information and the value comprises a second piece of network state information bound to the first piece of network state information.

15. The network control system of claim 12, wherein a particular managed forwarding element is for receiving updates to forwarding state information from the set of managed forwarding elements, maintaining the forwarding state information received from the set of managed forwarding elements, receiving forwarding state information requests from the set of managed forwarding elements, and sending responses to the received requests with requested network state information.

16. The network control system of claim 15, wherein the received updates comprise keys and values bound to the keys, a forwarding state information request comprises a key for which a value is required, and the response to the received request comprises the key and the value bound to the key.

17. The network control system of claim 16, wherein the received updates further comprise a time to live that specifies a time duration during which the received updates are valid.

18. The network control system of claim 15, wherein the received updates further comprise instructions to remove a forwarding state record from the maintained forwarding state information.

19. The network control system of claim 12, wherein a first managed forwarding element is for sending a data packet to a second managed forwarding element using received forwarding state information, receiving a notification from a third managed forwarding element that a particular one of its forwarding state records used to send the packet to the second managed forwarding element is invalid, and removing the invalid forwarding state record from its forwarding state information.

20. The network control system of claim 19, wherein the first managed forwarding element is further for relaying the notification to a fourth managed forwarding element in order for the fourth managed forwarding element to remove the invalid forwarding state record from its network forwarding state information.

* * * * *